United States Patent
Liao et al.

(10) Patent No.: US 9,179,517 B2
(45) Date of Patent: *Nov. 3, 2015

(54) BACKLIGHT CONTROL CIRCUIT WITH UNDER CURRENT DETECTION AND START-UP CONTROL

(71) Applicant: RICHTEK TECHNOLOGY CORPORATION, Chupei, Hsin-Chu (TW)

(72) Inventors: Chiawei Liao, San Jose, CA (US); Jing-Meng Liu, Jubei (TW)

(73) Assignee: RICHTEK TECHNOLOGY CORPORATION, Chupei, Hsin-Chu (TW)

(*) Notice: Subject to any disclaimer, the term of this patent is extended or adjusted under 35 U.S.C. 154(b) by 106 days.

This patent is subject to a terminal disclaimer.

(21) Appl. No.: 13/966,075

(22) Filed: Aug. 13, 2013

(65) Prior Publication Data

US 2014/0009075 A1 Jan. 9, 2014

Related U.S. Application Data

(62) Division of application No. 13/227,055, filed on Sep. 7, 2011, now abandoned.

(51) Int. Cl.
*H05B 37/02* (2006.01)
*H05B 33/08* (2006.01)
*G02F 1/1335* (2006.01)

(52) U.S. Cl.
CPC ........ *H05B 33/089* (2013.01); *G02F 1/133603* (2013.01); *G02F 2001/133612* (2013.01)

(58) Field of Classification Search
CPC . H05B 33/0872; H05B 33/0866; H05B 37/02
USPC .......................................... 315/291, 294, 297
See application file for complete search history.

(56) References Cited

U.S. PATENT DOCUMENTS

2005/0104542 A1* 5/2005 Ito et al. ......................... 315/291
2012/0081017 A1* 4/2012 Darshan et al. ............... 315/193

* cited by examiner

*Primary Examiner* — Don Le
(74) *Attorney, Agent, or Firm* — Tung & Associates

(57) ABSTRACT

The present invention discloses a backlight control circuit, comprising: a voltage supply circuit for receiving an input voltage and generating an output voltage under control by a control signal; at least one voltage comparison path respectively coupled to at least one light emission device path; a voltage operative amplifier circuit for generating the control signal according to a lowest voltage on the at least one voltage comparison path; and at least one under current detection circuit for detecting whether a corresponding one of the at least one light emission device path is in an under current status, whereby when anyone of the under current detection circuits detects the under current status, it sends an exclusion signal excluding a corresponding one of the at least one voltage comparison path from being an effective input of the voltage operative amplifier.

2 Claims, 20 Drawing Sheets

BACKLIGHT CONTROL CIRCUIT WITH UNDER CURRENT DETECTION AND START-UP CONTROL

CROSS REFERENCE

The present invention is a divisional application of U.S. Ser. No. 13/227,055, filed on Sep. 7, 2011.

FIELD OF INVENTION

The present invention relates to a backlight control circuit, more particularly, to a backlight control circuit capable of automatically adjusting supply voltage to light emitting diodes (LEDs).

BACKGROUND OF THE INVENTION

In a liquid crystal display (LCD), a backlight control circuit is used which controls LEDs to illuminate from the back side of an LCD screen, so that a user can observe an image from the front side of the LCD screen.

In early days, LED backlight is used only in a small size screen, which does not require high backlight brightness. Therefore, the LEDs can be connected all in series or all in parallel. FIG. 1 shows a prior art circuit wherein all LEDs are connected in series. As shown in the figure, a backlight control circuit 10 comprises a voltage supply circuit 11 providing output voltage Vout to a plurality of LEDs L1-LN connected in series. A resistor R is provided on a path of the LEDs connected in series, and a voltage at a node Vsense1 is compared with a reference voltage Vref to check whether a current through the path satisfies a predetermined condition. If the current is lower than a predetermined value and the voltage at the node Vsense1 decreases, an error amplifier circuit 13 sends a signal 15 to the voltage supply circuit 11 to pull up the output voltage Vout, so that the current flowing through the LEDs increases. Moreover, to prevent the voltage supply circuit 11 from unlimitedly increasing the output voltage Vout (for example, when the error amplifier circuit 13 malfunctions, or when the path of the LEDs is open), an over voltage protection circuit 12 is provided in the backlight control circuit 10, which detects the output voltage Vout and sends a signal to stop the voltage supply circuit 11 from increasing the output voltage Vout if the output voltage Vout is excessively high. (Depending on circuit design, the voltage supply can be totally stopped, or kept at an upper limit value. The latter is more popular in a backlight control circuit.)

FIG. 2 shows a typical structure of an over voltage protection circuit 12, wherein the output voltage Vout is monitored by comparing the voltage at the node Vsense2 with a reference voltage Vovp. The result of comparison determines a signal for controlling the voltage supply circuit 11.

The above arrangement wherein all LEDs are connected in series has several drawbacks. The output voltage Vout can not be too high for cost and safety reasons; therefore, the number of LEDs that can be connected in series is limited. When the backlight brightness requirement increases for a larger size LCD screen, it becomes impossible to connect all LEDs in one path. In addition, due to series connection, if one LED shuts down, all the other LEDs are shut down; the LCD will be in complete darkness.

Referring to FIG. 3, it shows a conventional backlight control circuit with LEDs all connected in parallel. As shown in the figure, in a backlight control circuit 20, the currents passing through LEDs L1-LN are respectively controlled by the current sources CS1-CSN. The backlight control circuit 20 comprises a lowest voltage selection circuit 21 which chooses a lowest voltage value among all voltages at cathode ends of the LEDs L1-LN, and the error amplifier circuit 13 compares the lowest voltage value with a reference voltage to generate a signal controlling the voltage supply circuit 11. Thus, the output voltage Vout is under control so that all current source circuits are provided with sufficient operating voltage for normal operation, and all LEDs can illuminate normally thereby.

Similarly, the backlight control circuit 20 can further comprise an over voltage protection circuit 12 as the one described above.

The above arrangement wherein all LEDs are connected in parallel has the following drawbacks. Because the backlight control circuit 20 is an integrated circuit, the number of its pins (shown by hollow squares in the figure) is limited for cost and other reasons, which limits the number of LEDs to be connected. When the backlight brightness requirement increases for a larger size LCD screen, the number of pins becomes insufficient. In addition, if one of the LEDs shuts down, or if a pin is short to ground, the lowest voltage selection circuit 21 will select the input corresponding to the shutdown LED or the grounded pin, and the error amplifier circuit 13 will keep asking the voltage supply circuit 11 to increase the output voltage Vout. Under the circumstance, the voltage supply circuit 11 can not adjust its output voltage Vout according to normal LEDs. In the case where an over voltage protection circuit is provided, the output voltage Vout will be kept at the upper limit, causing unnecessary power consumption and reducing power efficiency. In the case where no over voltage protection circuit is provided, the integrated circuit, sometimes the LEDs as well, may be burned out. Furthermore, if the number of pins of the integrated circuit is larger than required, excess pins have to be connected to the output voltage Vout to avoid malfunction by the lowest voltage selection circuit 21, but such solution is not desired because it wastes the energy provided at the output terminal, and it causes heat and other issues.

Because the number of LEDs that are allowed to be connected all in series or all in parallel in the above conventional arrangements is limited, it naturally leads to connecting the LEDs partially in series and partially in parallel (series-parallel connection). FIG. 4 shows a prior art arrangement of such series-parallel connection in which the backlight control circuit 10 shown in FIG. 1 is employed to provide voltage to a series-parallel connection circuit of LEDs. However, it only checks the current on the path of LEDs L1-LN but does not check those on the other paths. Apparently, this is not a perfect arrangement because the LEDs in the other paths are not under control; the currents flowing through the LEDs are not accurate.

In another prior art arrangement, multiple backlight control circuits 10 are employed each of which controls one LED path so that every path is under control. Although such multiple backlight control circuits 10 can be integrated in one integrated circuit, it is obviously not cost effective.

Another prior art arrangement is shown in FIG. 5 which employs the backlight control circuit 20 shown in FIG. 3 to compose a series-parallel connection circuit for LEDs. In this arrangement, although the number of LEDs to be connected is increased, it still has the drawback that if one of the LED paths is open, the lowest voltage selection circuit 21 will force the voltage supply circuit 11 to increase the output voltage Vout unlimitedly. Moreover, if the number of pins of the integrated circuit is more than required, the excess pins becomes a hot potato; the output voltage Vout in FIG. 5 is a much higher voltage (for supplying operative voltage to multiple LEDs connected in series) than the output voltage Vout in FIG. 3, and thus if the excess pins are connected to the output voltage Vout, the device inside the current source circuit has to be a costly high voltage device. However, if the excess pins are not connected to the output voltage Vout, there is no low-cost solution to arrange those pins. As such, the circuit shown in FIG. 5 can only be applied to limited applications, and it has low immunity, that is, it is vulnerable to malfunctions and other circuit errors.

SUMMARY

In view of the foregoing, it is therefore an objective of the present invention to provide a backlight control circuit capable of automatically adjusting supply voltage to LEDs, to solve the problems in prior art.

It is another objective of the present invention to provide a backlight control method to solve the problems in prior art.

In accordance with the foregoing and other objectives, and from one aspect of the present invention, a backlight control circuit comprises: a voltage supply circuit, under control by a control signal, for receiving an input voltage and generating an output voltage; at least one voltage comparison path respectively coupled to at least one light emission device path; a voltage operative amplifier circuit for generating the control signal according to the lowest voltage on the at least one voltage comparison path; and at least one under current detection circuit for detecting whether a corresponding one of the at least one light emission device path is in an under current status, whereby when any of the under current detection circuits detects the under current status, it sends an exclusion signal excluding a corresponding one of the at least one voltage comparison path from being an effective input of the voltage operative amplifier.

The voltage operative amplifier circuit may be a lowest voltage comparison and amplifier circuit, or a high-low voltage comparison and amplifier circuit.

Preferably, the backlight control circuit further comprises a logic circuit or a start-up circuit to ensure proper initialization of the backlight control circuit.

In another aspect of the present invention, a method for controlling light emission devices comprises: providing a plurality of light emission device paths connected in parallel; supplying an output voltage to a node where the plurality of light emission device paths are coupled to; extracting a voltage signal from each of the plurality of light emission device paths; detecting whether each of the plurality of light emission device paths is in an under current status; selecting the lowest one of the extracted voltages from the plurality of light emission device paths which are not in the under current status; and controlling the output voltage according to the selected lowest voltage.

Preferably, the selected lowest voltage is compared with a reference voltage so as to control the output voltage. The reference voltage can be a constant or a variable voltage.

Preferably, the output voltage is still supplied when both or all of the light emission device paths are in the under current status.

These and other features, aspects, and advantages of the present invention will become better understood with reference to the following description of preferred embodiments and accompanying drawings.

DESCRIPTION OF THE PREFERRED EMBODIMENTS

Figure 1:
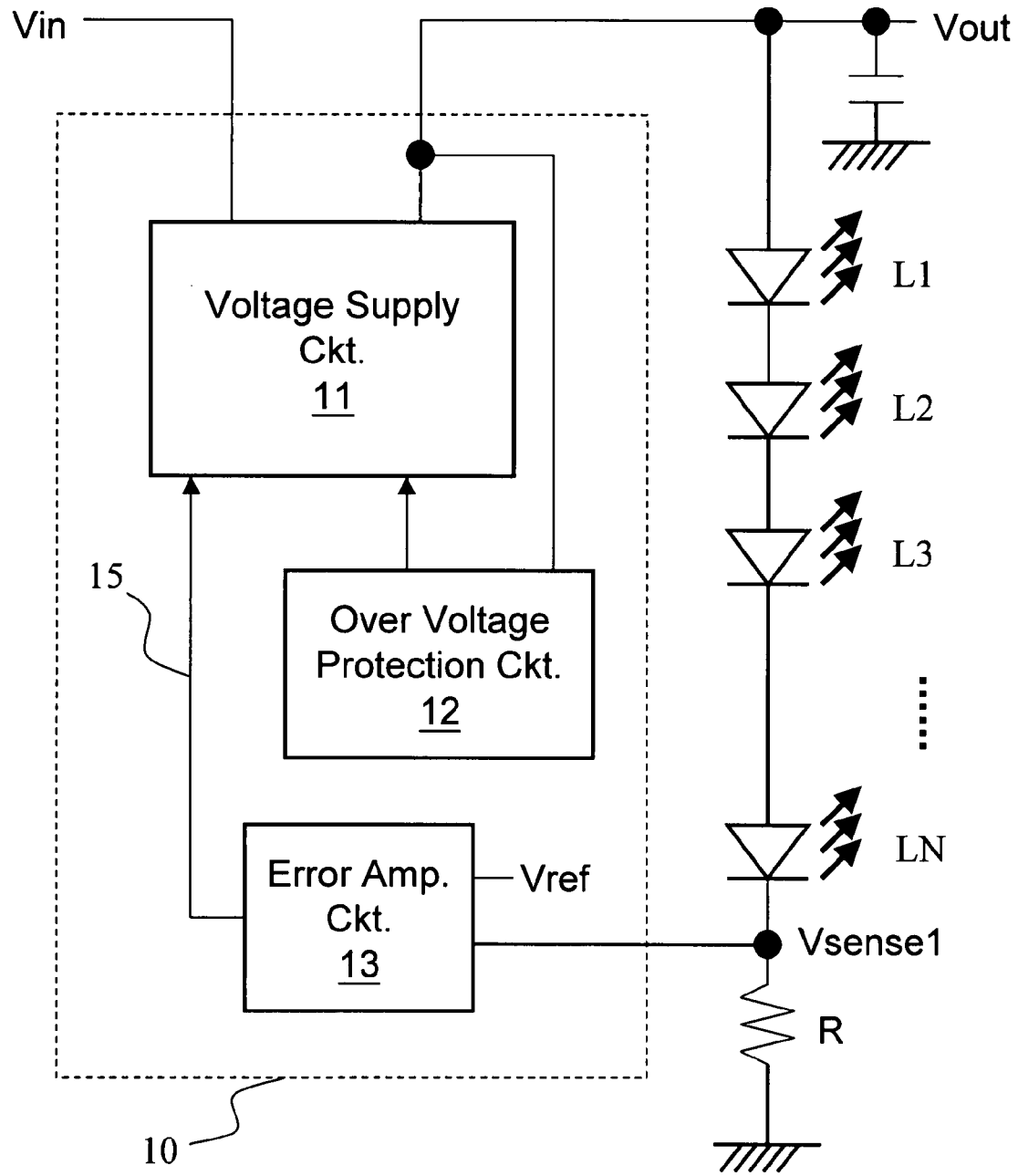
FIG. 1 is a schematic circuit diagram showing a prior art circuit including LEDs which are all connected in series and a backlight control circuit thereof.
Figure 2:
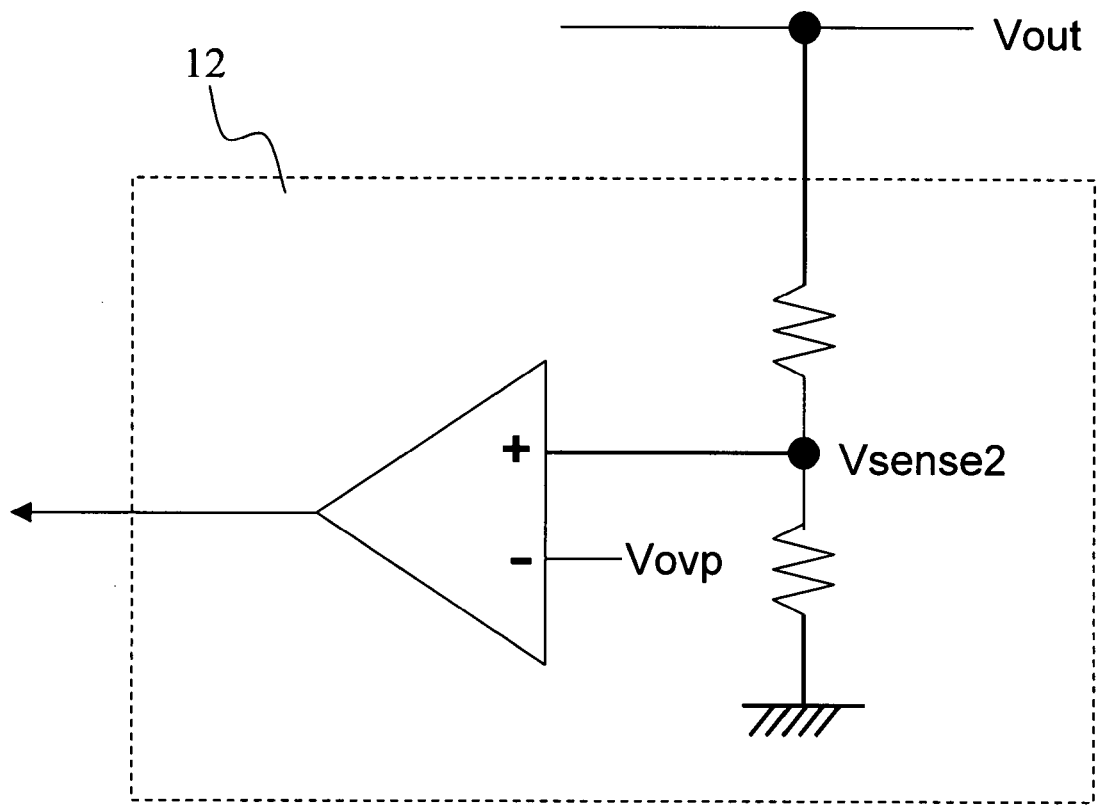
FIG. 2 is a schematic circuit diagram showing a conventional over voltage protection circuit.
Figure 3:
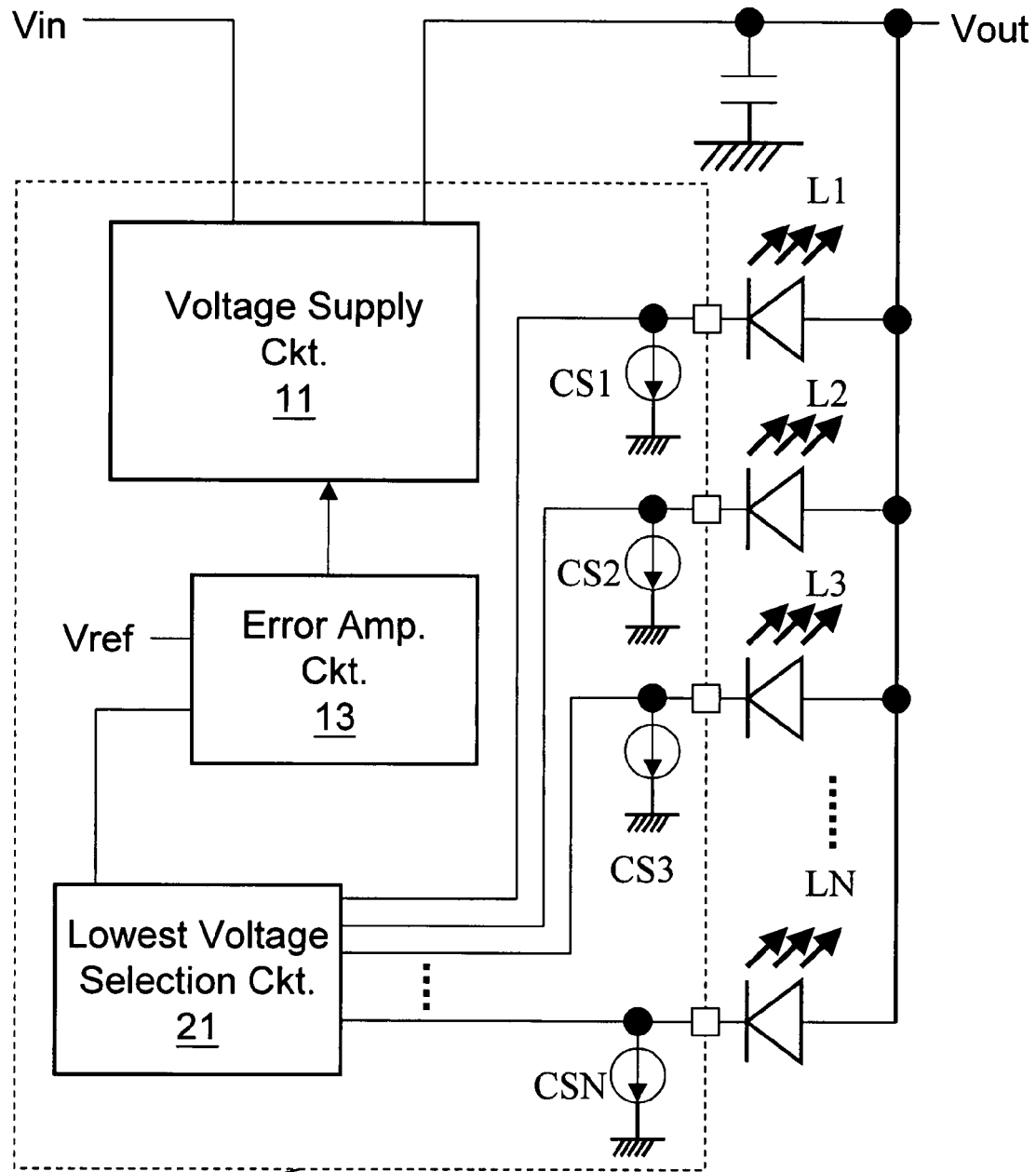
FIG. 3 is a schematic circuit diagram showing a prior art circuit including LEDs which are all connected in parallel and a backlight control circuit thereof.
Figure 4:
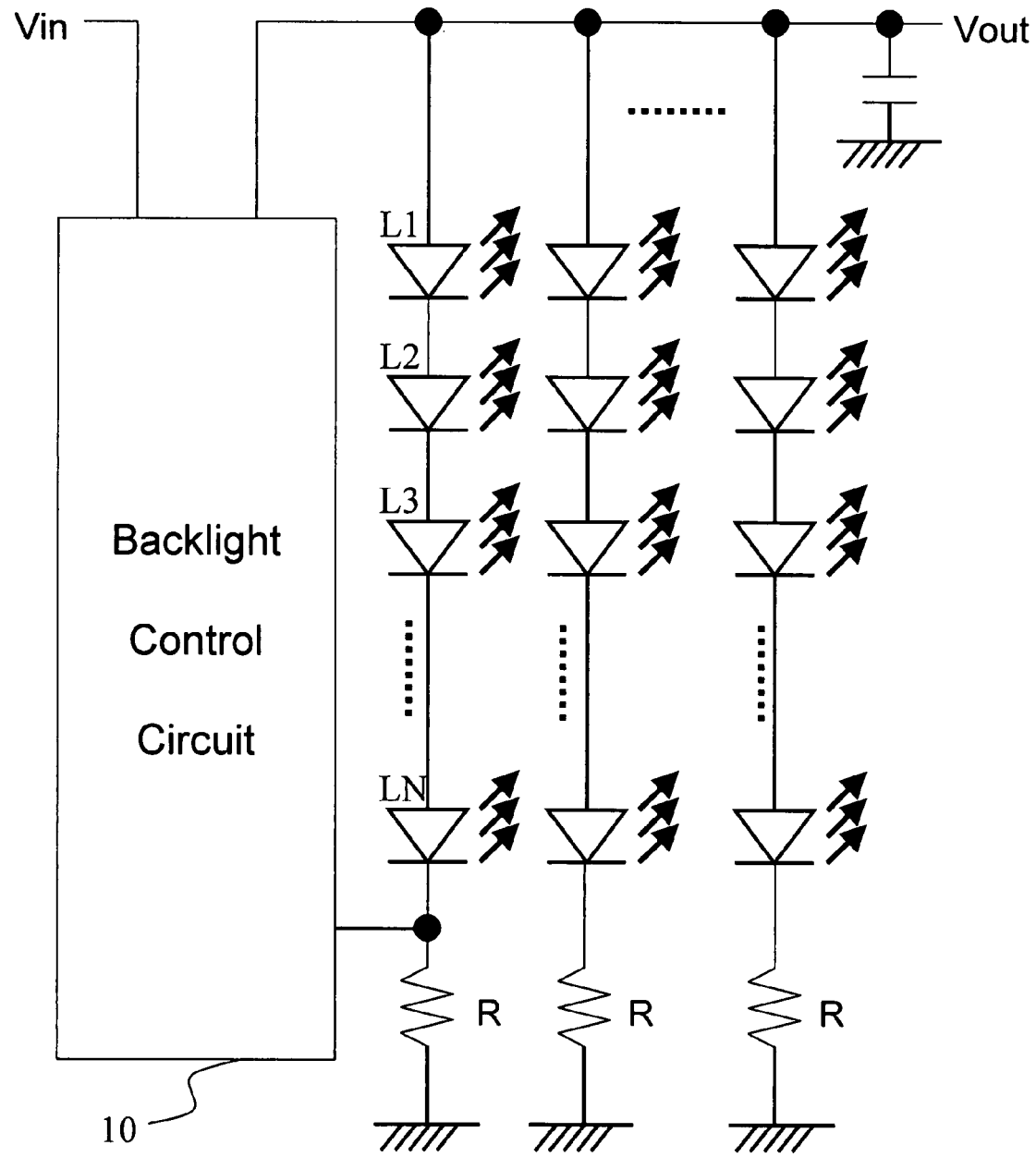
FIG. 4 is a schematic circuit diagram showing a prior art circuit including LEDs which are connected partially in series and partially in parallel, and a backlight control circuit thereof.
Figure 5:
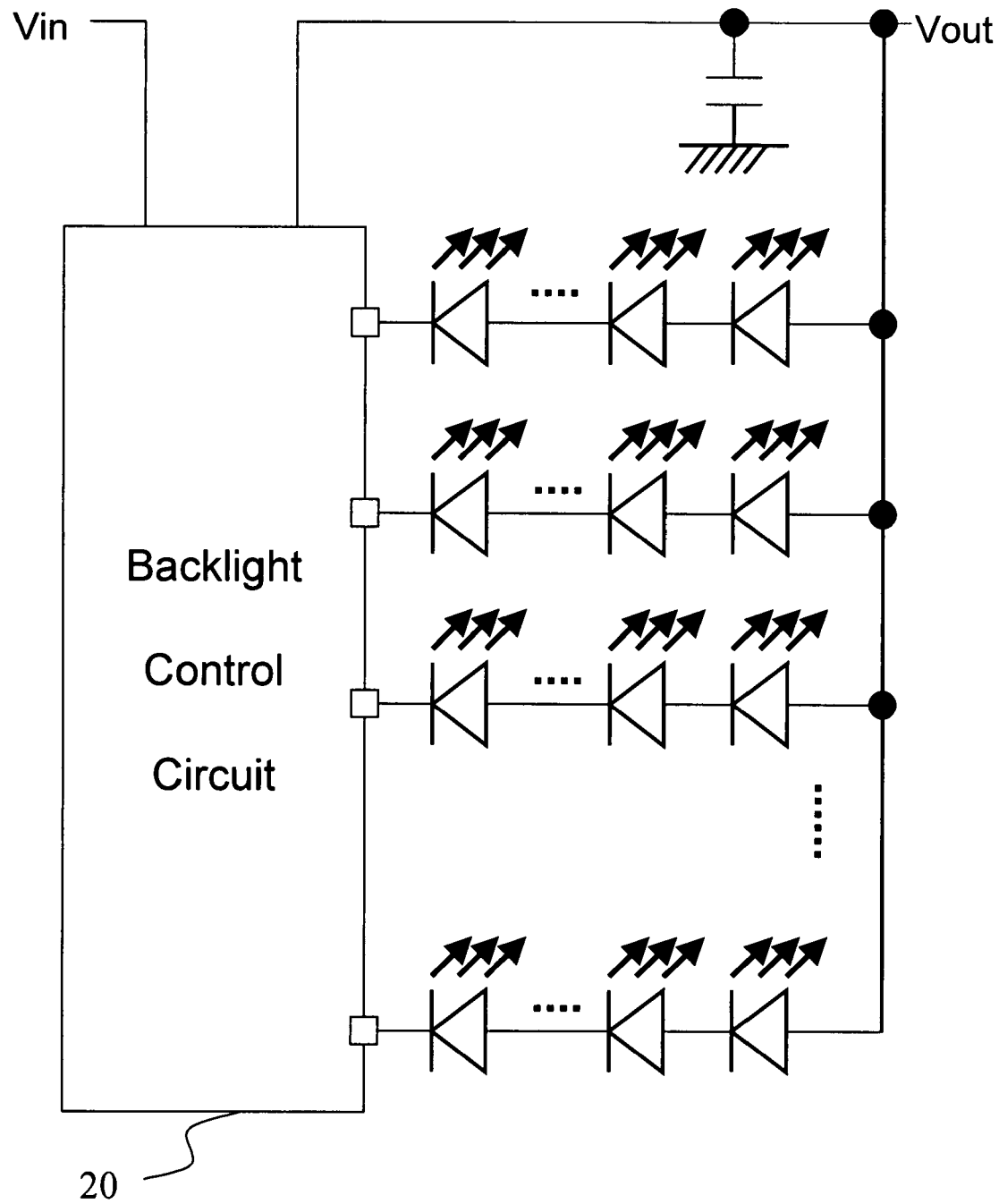
FIG. 5 is a schematic circuit diagram showing another prior art circuit including LEDs which are connected partially in series and partially in parallel, and a backlight control circuit thereof.
Figure 6:
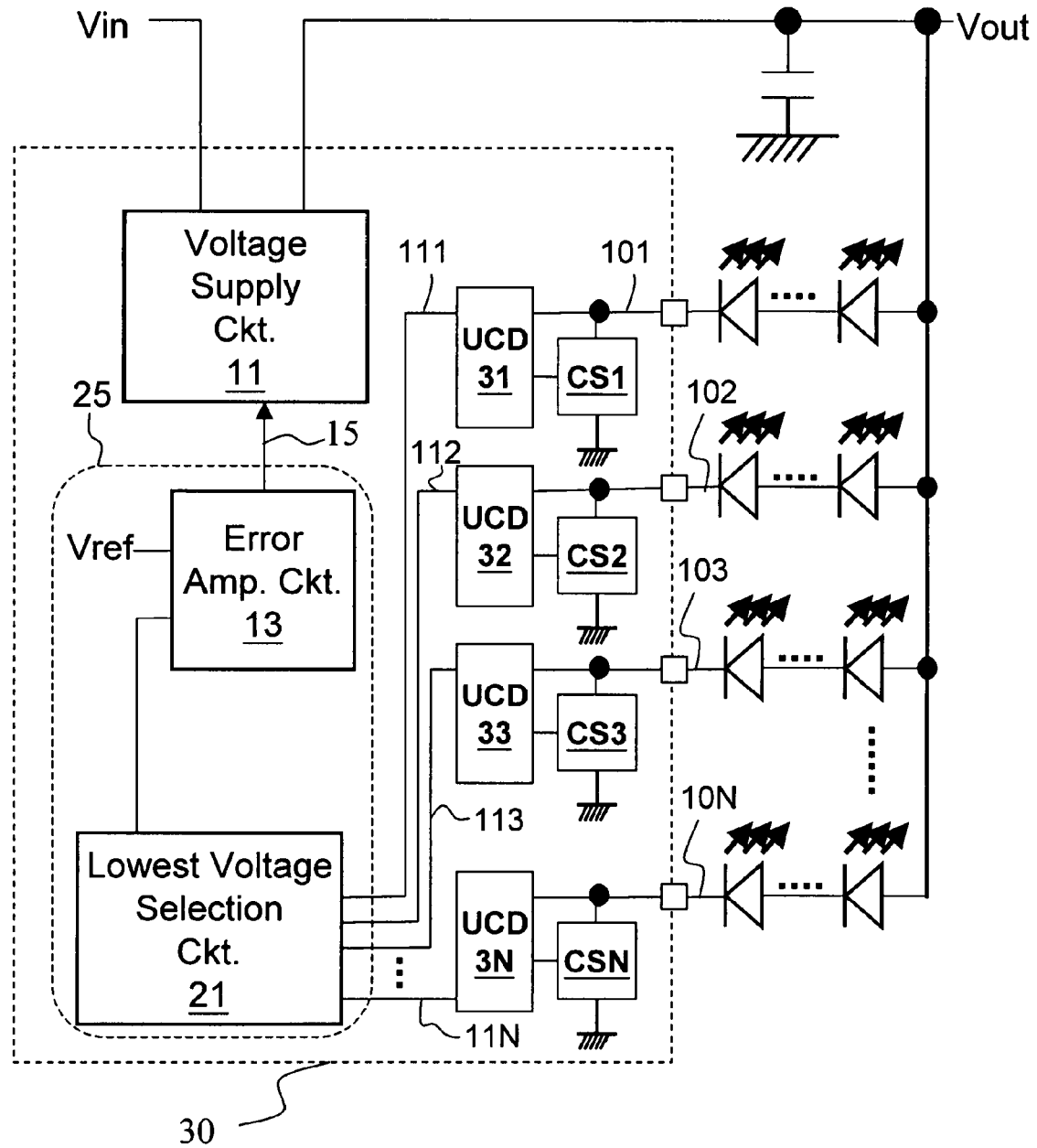
FIG. 6 is a schematic circuit diagram showing a backlight control circuit according to an embodiment of the present invention.

FIG. 6 is a schematic circuit diagram showing a backlight control circuit according to an embodiment of the present invention. As shown in the figure, in addition to the voltage supply circuit 11, the error amplifier circuit 13, the lowest voltage selection circuit 21 and the current sources CS1-CSN (shown by circuit blocks), the backlight control circuit 30 according to this embodiment further comprises under current detection (UCD) circuits 31-3N. The UCD circuits 31-3N detect the current conditions on the LED paths 101-10N to determine whether an under current status, i.e., a "no current" or "very low current" condition, occurs in any of the paths. (An LED path 101-10N is a path from the node of the output voltage Vout to ground.) When "no current" or "very low current" condition does not occur, the voltage signals on the LED paths 101-10N pass through the UCD circuits 31-3N to the corresponding voltage comparison paths 111-11N, so that the lowest voltage selection circuit 21 receives those signals. The paths 111-11N are referred to as "voltage comparison paths" because the one with the lowest voltage among the paths 111-11N will be compared with a reference voltage Vref in the error amplifier circuit 13. When any one or more LED paths 101-10N have no current or very low current, the UCD circuits 31-3N exclude the corresponding one or more voltage comparison paths 111-11N so that they are not valid inputs to the lowest voltage selection circuit 21, that is, the lowest voltage selection circuit 21 does not accept signals on these invalid voltage comparison paths 111-11N.

Figure 7:
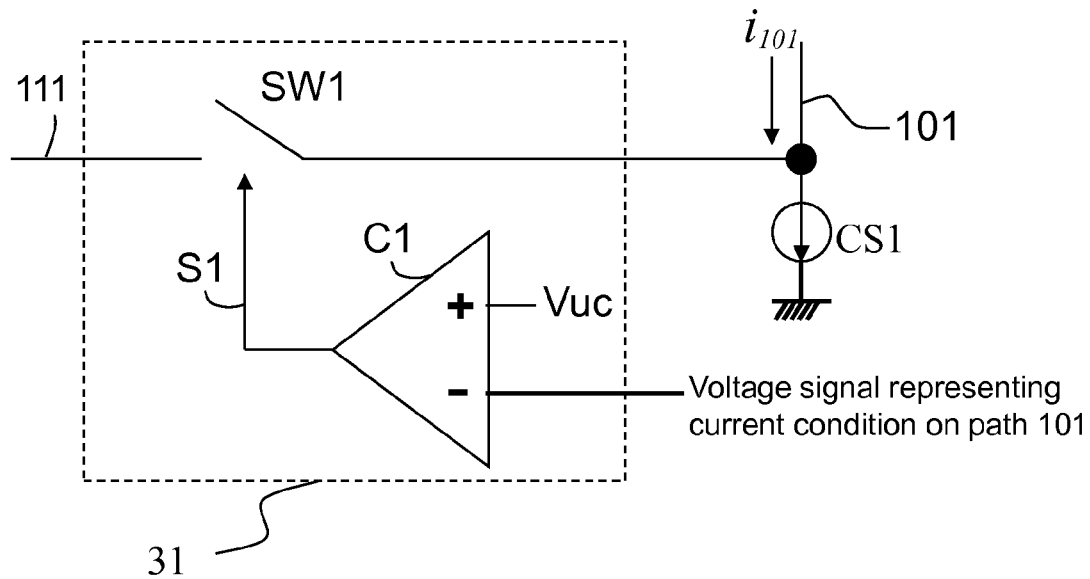
FIG. 7 is a diagram for explaining the concept of under current detection.

The foregoing concept can be understood more clearly with reference to FIG. 7, which shows the UCD circuit 31 as an example. The current condition $i_{101}$ on the LED path 101 is converted to a voltage signal, and compared with a preset reference voltage Vuc. The comparison result is represented by a signal S1 which controls a switch SW1 so that when "no current" or "very low current" condition occurs in the path 101, the switch SW1 is opened. (Of course, depending on the design of the switch SW1, the output of the comparator CP1 may need to be inverted.) Note that FIG. 7 is only an example for illustrating the concept; the switch need not necessarily be located in the path 111, as long as the desired effect (to exclude the signal on the path 111 from the inputs of the lowest voltage selection circuit 21) can be achieved. This will be further explained later with reference to FIGS. 10B, 10C, 13A and 13B.

Figure 8A:
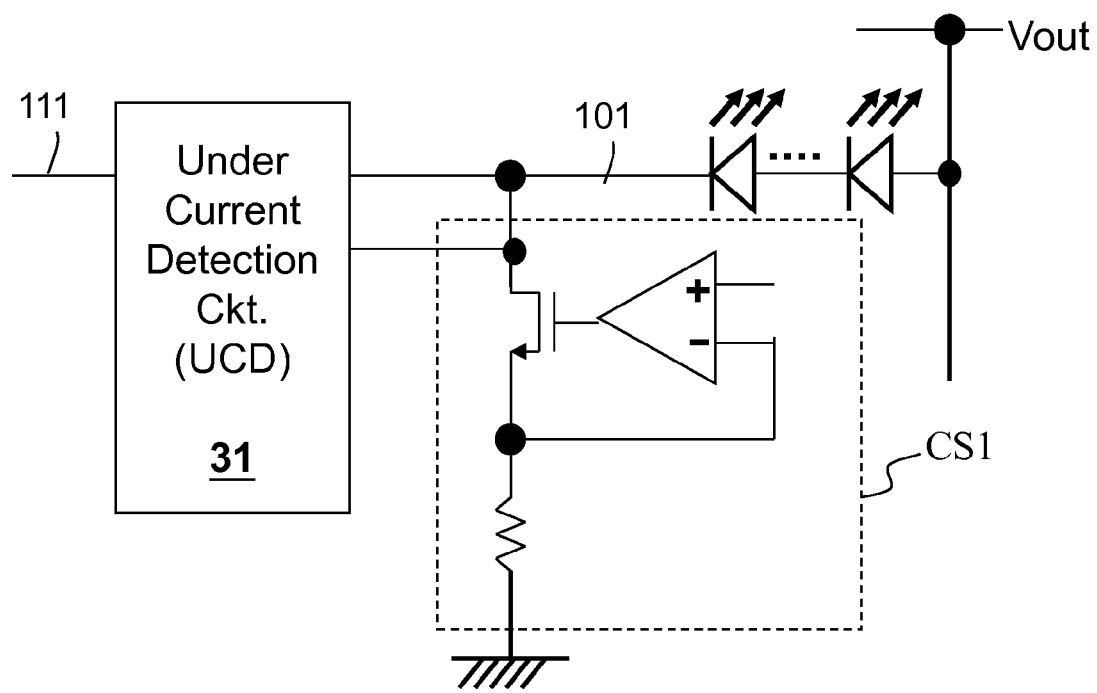
FIGS. 8A-8C show several embodiments for under current detection, wherein the current source is made of a MOSFET.
Figure 8B:
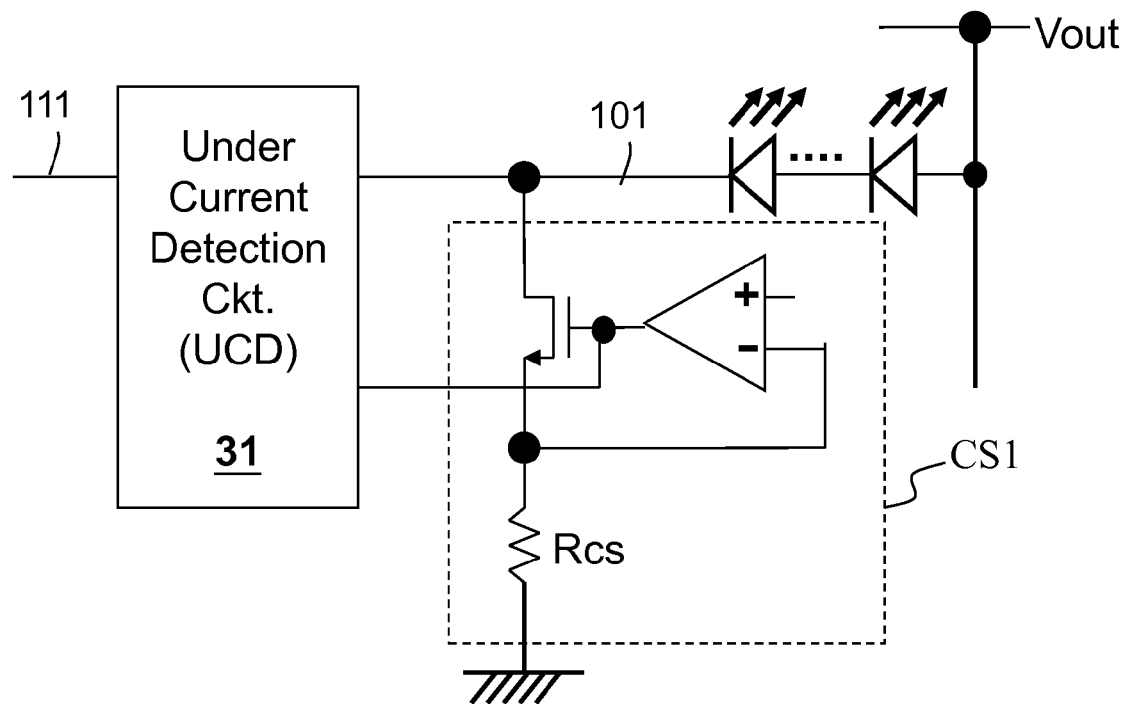
Figure 8C:
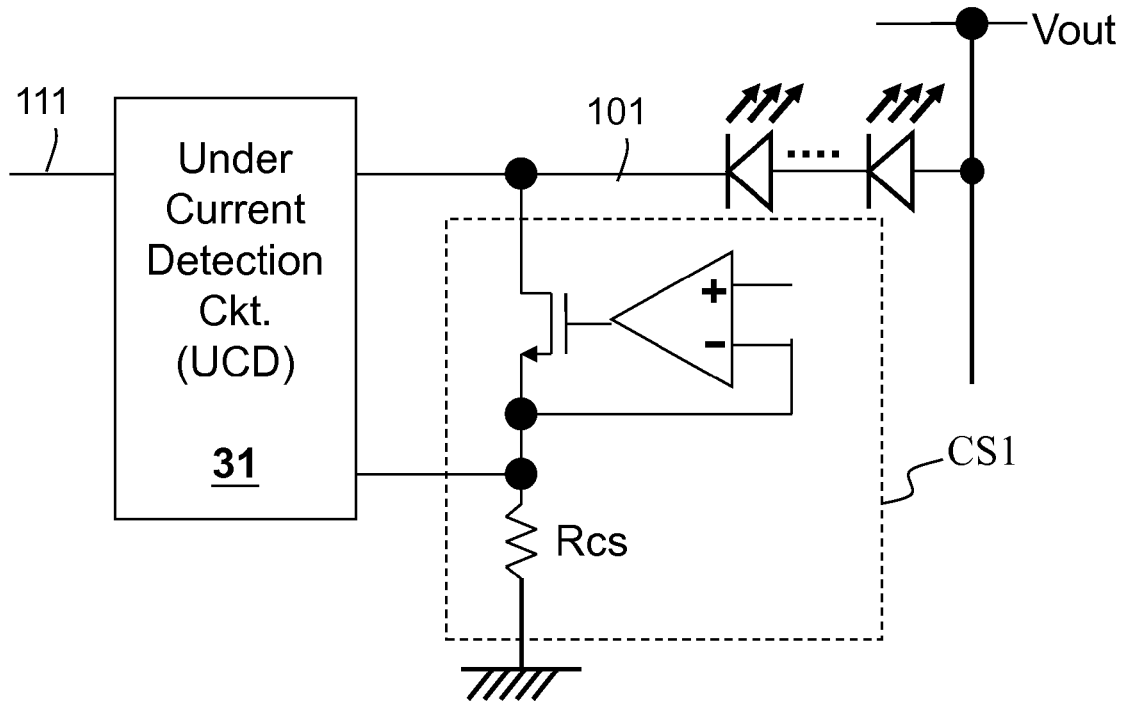

There are many ways to convert the current condition on the LED path 101 into a voltage signal; here are some examples. Referring to FIG. 8A, if the current source CS1 is made of an NMOSFET, the drain voltage signal of the transistor can be extracted and sent to the UCD circuit 31 to be compared with a preset reference voltage Vuc. Or as shown in FIG. 8B, the gate voltage signal of the transistor can be extracted and sent to the UCD circuit 31 to be compared with a preset reference voltage Vuc. (In "no current" or "very low current" condition, because of feedback control mechanism of the circuit, the gate voltage will increase to the output upper limit of the operative amplifier, which is different from the gate voltage in normal condition. Thus, by setting a proper reference voltage Vuc, the "no current" or "very low current" condition can be distinguished from the normal condition.) Or as shown in FIG. 8C, the source voltage signal of the transistor can be extracted and sent to the UCD circuit 31 to be compared with a preset reference voltage Vuc. Depending on the location for extracting voltage, the value of the reference voltage Vuc and the mechanism for comparison (higher or lower than Vuc) should be correspondingly designed to properly detect whether "no current" or "very low current" condition occurs in the path 101.

Figure 9A:
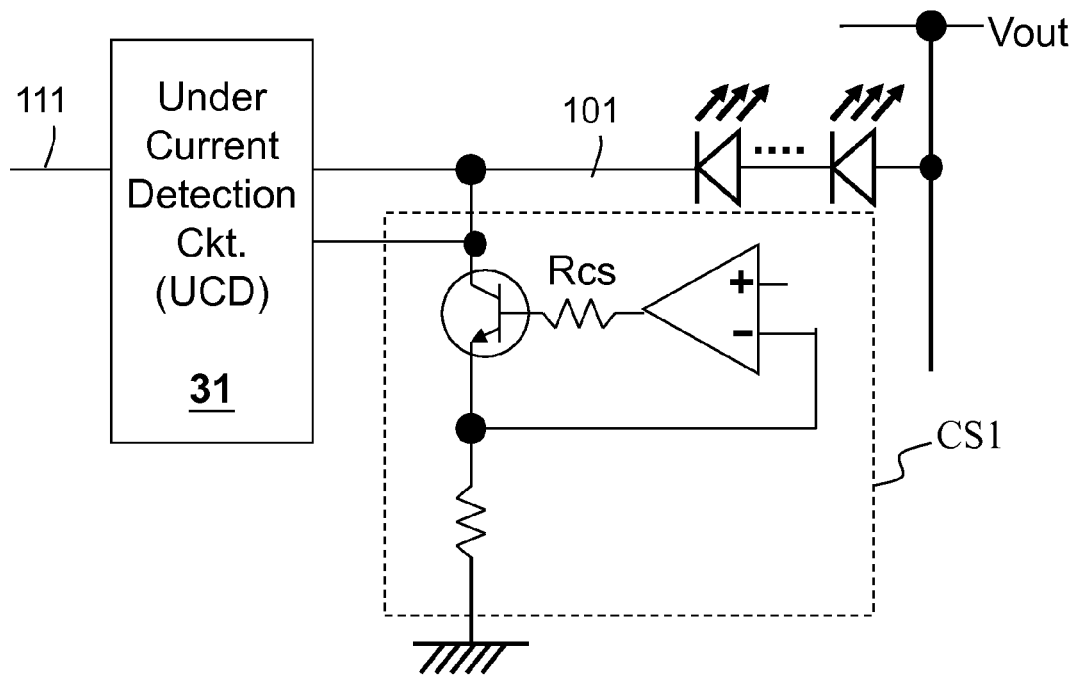
FIGS. 9A-9C show several embodiments for under current detection, wherein the current source is made of a bipolar transistor.
Figure 9B:
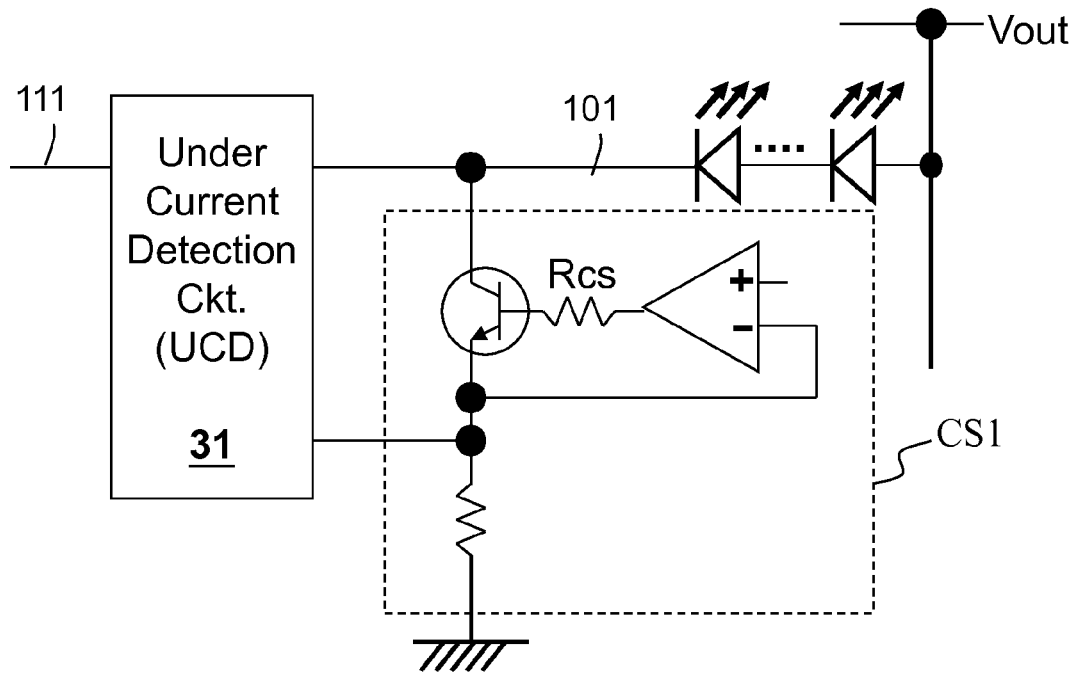
Figure 9C:
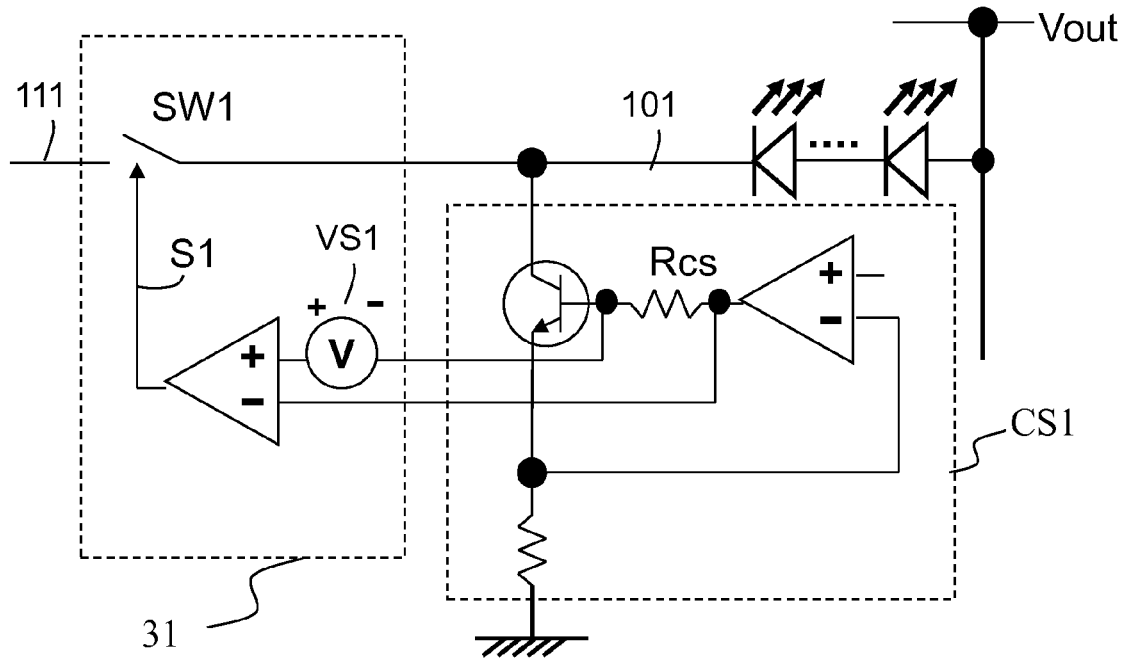

If the current source CS1 is made of a bipolar transistor, as shown in FIG. 9A, the collector voltage signal of the transistor can be extracted and sent to the UCD circuit 31 to be compared with a preset reference voltage Vuc. Or as shown in FIG. 9B, the emitter voltage signal of the transistor can be extracted and sent to the UCD circuit 31 to be compared with a preset reference voltage Vuc. Or as shown in FIG. 9C, the base voltage signal of the transistor can be extracted and compared with the voltage signal at the other end of a resistor Rcs, that is, to compare the voltage across the resistor Rcs with the voltage of a voltage source VS1. In "no current" or "very low current" condition, because of feedback control mechanism of the circuit, the operative amplifier will supply a base current much larger than what it is in the normal condition, and hence the voltage across the resistor Rcs will greatly increase. Thus setting the voltage source VS1 is equivalent to setting the reference voltage Vuc. The result of the comparison determines the conduction of the switch SW1. Similar to the above, depending on the location for extracting voltage, the value of the reference voltage Vuc and the mechanism for comparison (higher or lower than Vuc) should be correspondingly designed.

In light of the teachings of the present invention, those skilled in this art should be able to design corresponding circuits according to different current sources; all such variations should belong to the scope of the present invention. In summary, because the current condition on the path 101 closely relates to the current source CS1, a voltage signal representing the current condition on the path 101 can be obtained by extracting a voltage from any terminal of the transistor in the current source CS1. In fact, the same effect can be achieved by detecting the voltage at one or more nodes in an external portion of the LED path outside the backlight control circuit, but it is less preferred because an additional pin is required. However, this variation should still fall in the scope of the present invention.

The UCD circuits 31-3N solve the problems in the prior art. More specifically, referring to FIG. 6, if anyone of the LED paths 101-10N is open or floating, the corresponding UCD circuits 31-3N will cut off the corresponding paths 111-11N. For example, if the LED path 101 is open, because the path 111 is cut off, the lowest voltage selection circuit 21 will select the one with the lowest voltage only from the paths 112-11N and input the selected one to the error amplifier 13. Although the LEDs in the path 101 cannot function, the voltage supply circuit 11 can still supply proper voltage to the rest of the operating LEDs; the voltage supply circuit 11 will not increase the output voltage Vout unlimitedly to burn out the circuit. Furthermore, when the number of pins to be connected with LED paths is more than required, the excess pins can be simply floating or grounded; such arrangement does not consume power, nor do the devices connected with the pins have to be high voltage devices.

Since the backlight control circuit of the present invention has better immunity that it does not increase the output voltage Vout unlimitedly, the over voltage protection circuit 12 is not absolutely necessary. In certain applications, the over voltage protection circuit 12 can be omitted to reduce cost, which is an advantage of the present invention over prior art. However, it is of course doable to provide the over voltage protection circuit 12 in the circuit of the present invention. The details as to how to include the over voltage protection circuit 12 in the circuit of the present invention are omitted here.

Figure 10A:
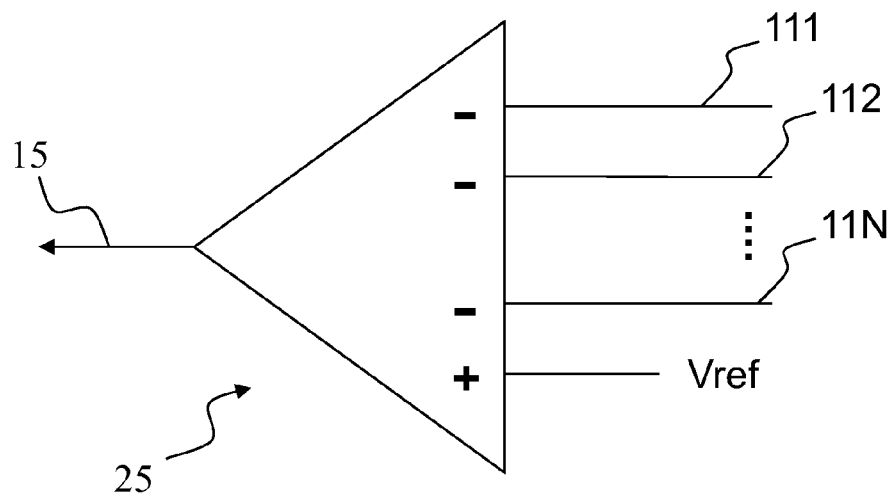
FIG. 10A is a diagram for explaining the concept of the lowest voltage comparison and amplifier circuit.
Figure 10B:
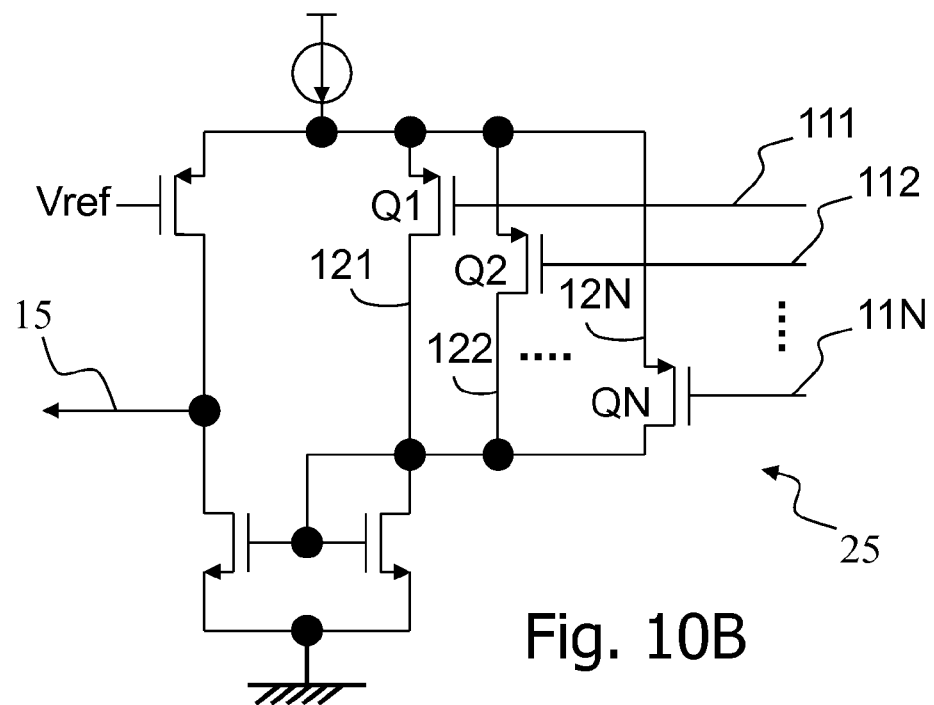
FIGS. 10B and 10C show two embodiments of the lowest voltage comparison and amplifier circuit.
Figure 10C:
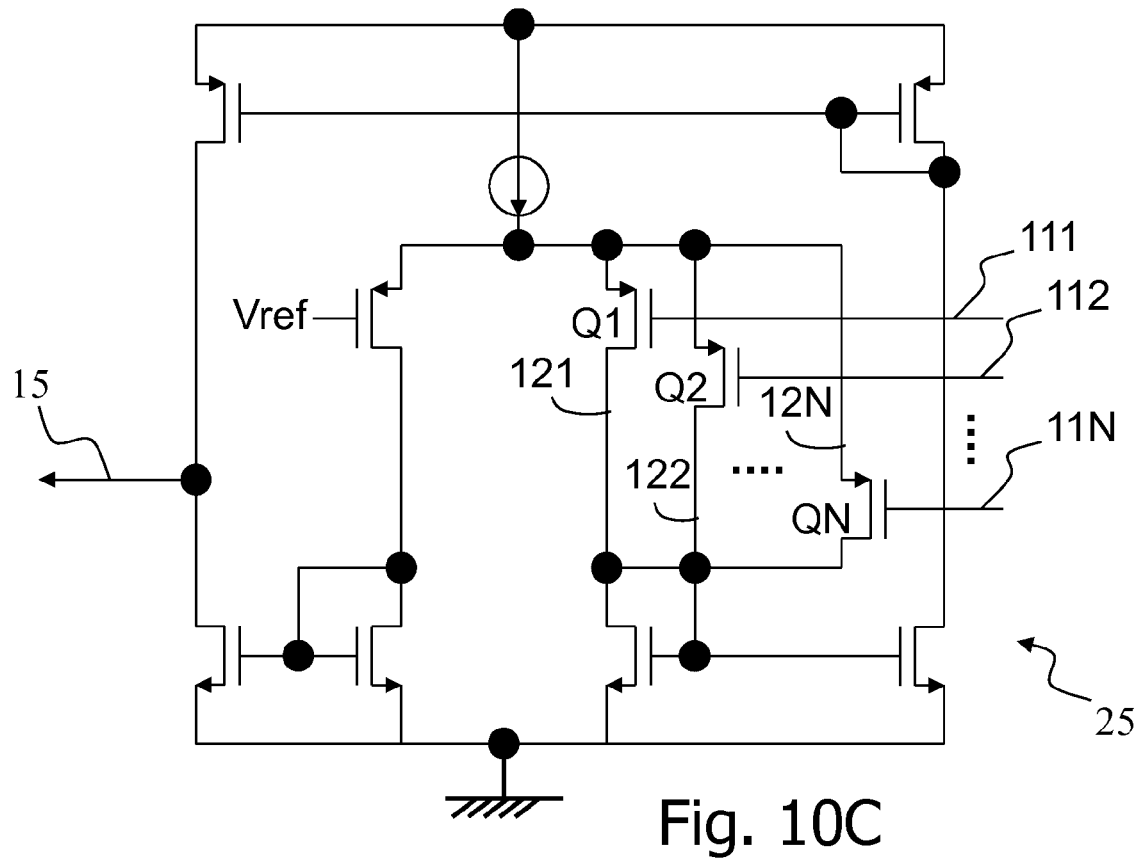

Practically, in one embodiment, the lowest voltage selection circuit 21 can be integrated with the error amplifier 13 to become one "lowest voltage comparison and amplifier circuit" 25, as shown in FIG. 10A. Two examples of such lowest voltage comparison and amplifier circuit 25 are shown in FIG. 10B (wherein only the input stage is shown; the circuit can be connected with another circuit stage to amplify the output) and FIG. 10C. It can be seen from FIGS. 10B and 10C that it does not have to cut off a path 111-11N to remove it from the valid inputs of the lowest voltage comparison and amplifier circuit 25; the same effect can be achieved by cutting off its corresponding path 121-12N. (To do so, a switch should be provided in each of the paths 121-12N, not shown). In this case, although there is a voltage signal in the path 111-11N, the corresponding input of the lowest voltage comparison and amplifier circuit 25 does not function. In fact, it is easier to cut off the paths 121-12N than to cut off the paths 111-11N; the paths 111-11N control the gate of PMOS transistors Q1-QN, and therefore, to cut off a path 111-11N, the gate voltage of the corresponding PMOS transistors Q1-QN should be pulled high. More details for this will be described later with reference to the examples of FIGS. 13A and 13B.

The lowest voltage comparison and amplifier circuit 25 can be made of devices other than MOSFETs, such as of bipolar transistors or junction FETs. It is also doable to separate the error amplifier 13 from the lowest voltage comparison and amplifier circuit 25. All such variations should belong to the scope of the present invention.

In the backlight control circuit according to the present invention, if no current flows on one or more of the LED paths 101-10N, the corresponding voltage comparison paths 111-11N are excluded so as not to be an effective input of the lowest voltage selection circuit 21. However, during circuit initialization stage, it is possible that none of the voltage comparison paths 111-11N are valid inputs to the lowest voltage selection circuit 21 because there is no current on all of the LED paths 101-10N. Thus the voltage supply circuit 11 might not be initialized to supply power. To avoid this malfunction, several approaches are described below for example.

Figure 11:
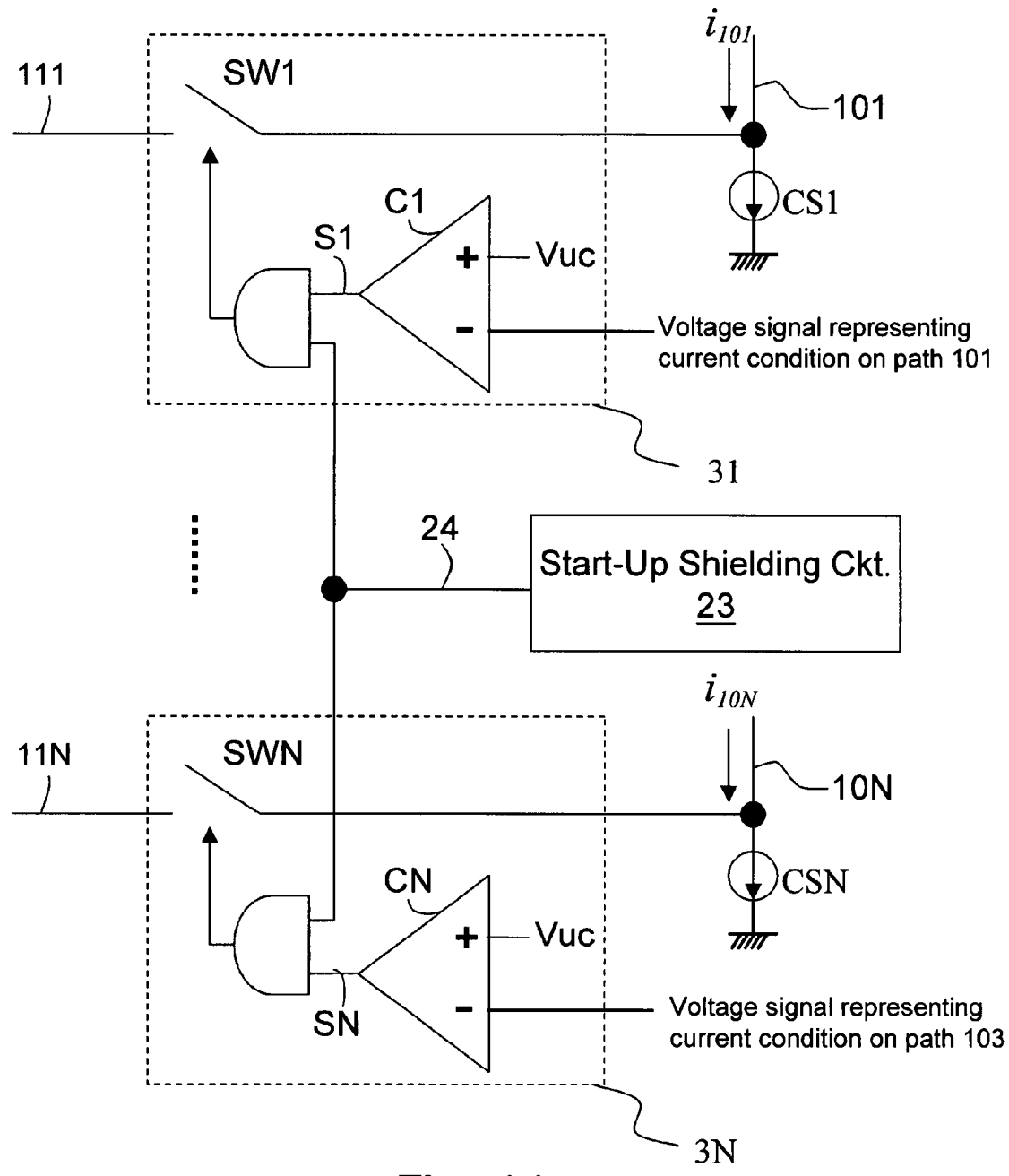
FIG. 11 is a schematic circuit diagram showing a backlight control circuit according to another embodiment of the present invention, wherein a start-up shielding circuit is employed to shield the detection signals generated by the UCD circuits 31-3N.

First, during circuit initialization stage, the UCD circuits 31-3N can be shielded based on a signal relating to circuit initialization, such as the power on reset signal or the soft start signal, so that the UCD circuits 31-3N do not send out the signals S1-SN, or the signals S1-SN are sent out but neglected within a start-up period from the start of circuit initialization. This period can be terminated by a signal which is typically generated after the circuit initialization stage is over (such as the end signal of the soft start signal), by counting a fixed time period by a counter, or by monitoring whether the output voltage Vout exceeds a predetermined value (which can be done by one comparator). In the former two cases, to prevent the output voltage from increasing to an extremely high level during the circuit initialization stage, an over voltage protection circuit 12 may be provided, or the time period of circuit initialization may be limited so that the output voltage Vout does not increase above a certain limit. FIG. 11 shows an embodiment wherein a start-up shielding circuit 23 generates a shielding signal 24 according to any of the above or other methods, to shield the signals S1-SN of the UCD circuits 31-3N during the start-up period, and to recover the functions of the signals S1-SN after the start-up period is over. Note that the logic AND gate in the figure is only an example; the shielding function can be achieved by any suitable method. In addition, the shielding signal 24 need not shield all of the signals S1-SN, but instead can shield only one or several of them.

If it is difficult to obtain a signal relating to circuit initialization, or if the accuracy of such signal is a concern, according to another embodiment of the present invention, a logic circuit can be provided which forces the voltage supply circuit 11 to supply power when all the UCD circuits 31-3N detect low current condition. Or, according to a still other embodiment of the present invention, a start-up circuit can be provided to ensure that the backlight control circuit 30 operates normally after circuit initialization.

Figure 12:
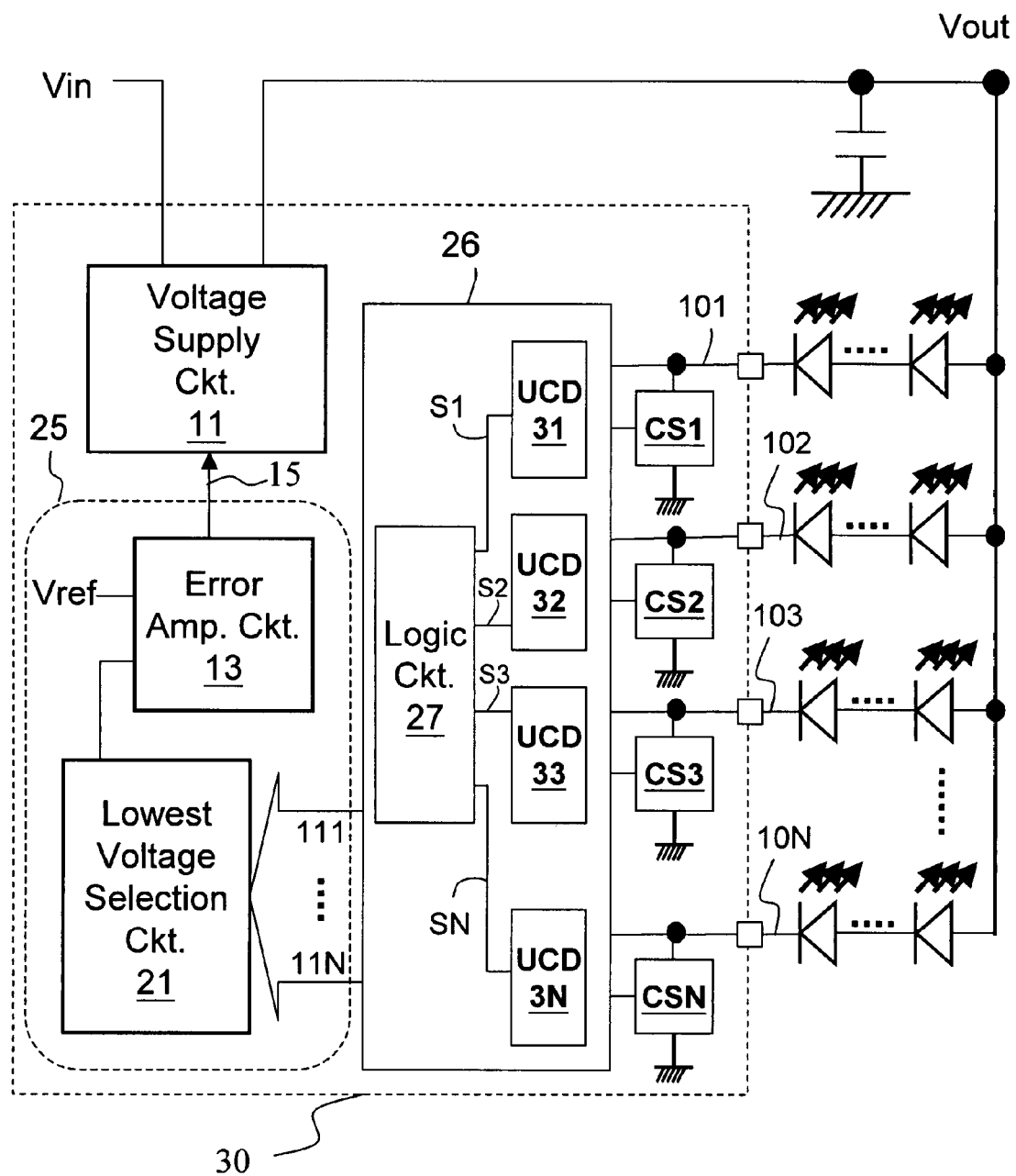
FIG. 12 is a schematic circuit diagram showing a backlight control circuit according to a further other embodiment of the present invention, wherein a logic circuit is employed to ensure proper initialization.

Referring to FIG. 12 which shows the embodiment employing a logic circuit, all the UCD circuits 31-3N are electrically connected with a logic circuit 27, to form an under current detection logic circuit (UCD logic circuit) 26. The logic operation of the logic circuit 27 is thus: when all the UCD circuits 31-3N concurrently detect low current condition, the detection is neglected, and at least one path among the paths 111-11N is allowed to be a valid input of the lowest voltage selection circuit 21. Thereby, the voltage supply circuit 11 starts to supply power, so that the backlight control circuit 30 and the LEDs operate under normal feedback control mechanism.

Figure 13A:
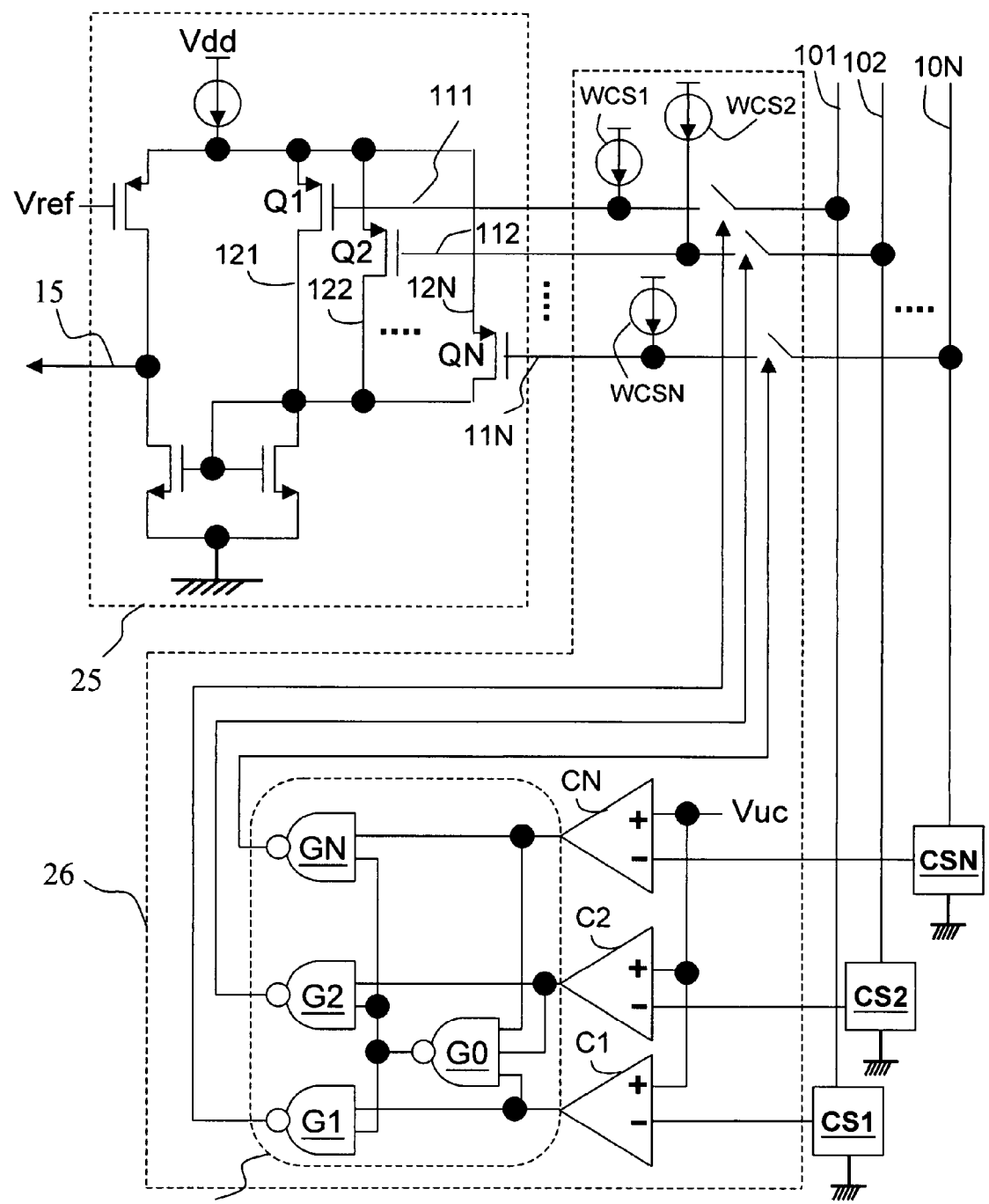
FIGS. 13A and 13B show two embodiments of the logic circuits.
Figure 13B:
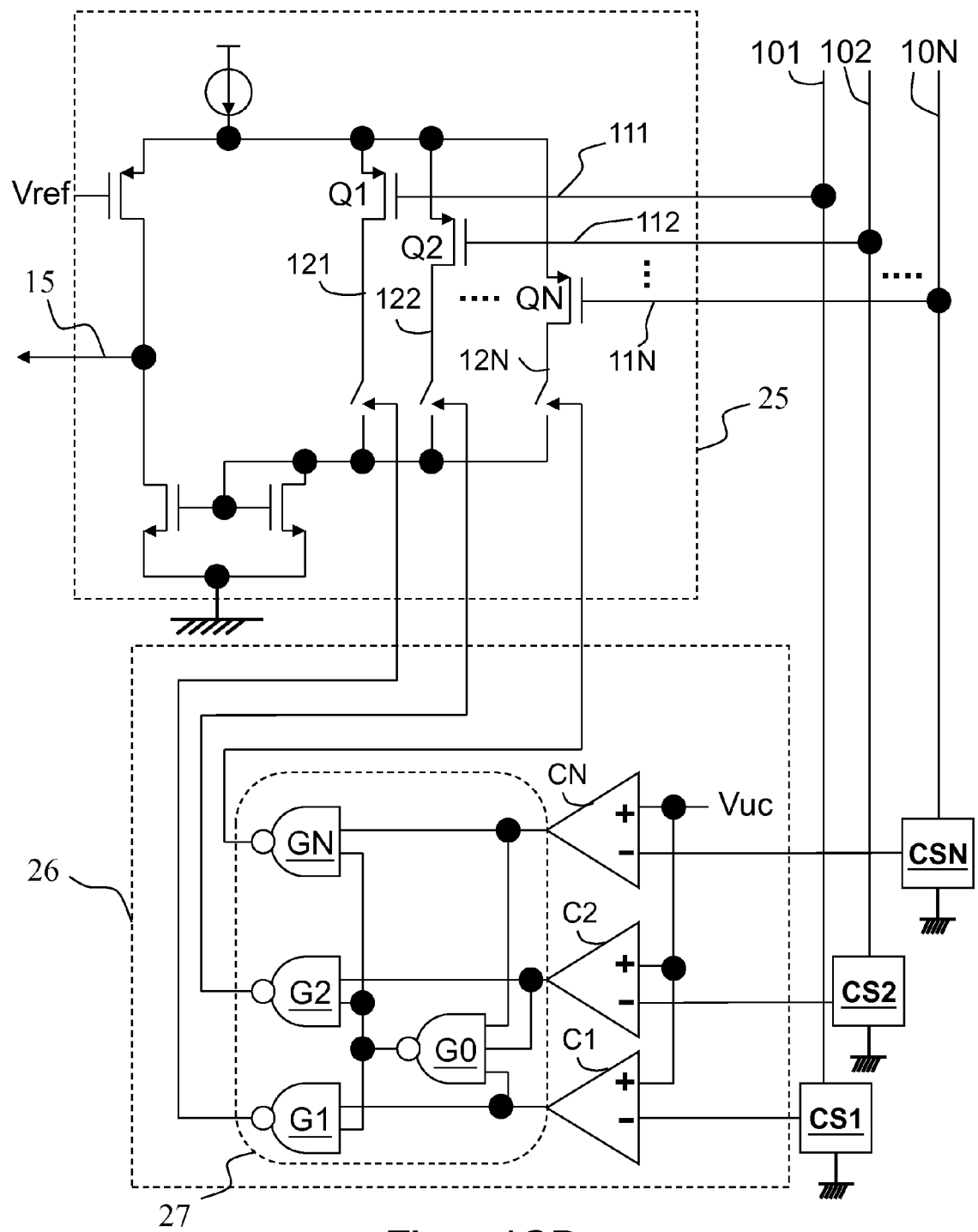

Two embodiments of the UCD logic circuit 26 are described in FIGS. 13A and 13B, wherein the lowest voltage comparison and amplifier circuit 25 of FIG. 10B is used. In the embodiment of FIG. 13A, the outputs from the comparators C1-CN do not directly control the switches in the paths 111-11N, but are subject to the logic operation by the logic circuit 27. The logic circuit 27 includes a first stage NAND gate G0 and a plurality of second stage NAND gates G1-GN. In each of the second stage NAND gates G1-GN, when either input is low, its output is high and thereby its corresponding path 111-11N is conducted. Each of the second stage NAND gates G1-GN has two inputs, one of which is the output of the corresponding comparators C1-CN, and the other of which is the output of the first stage NAND gate G0. When the output of the first stage NAND gate G0 is low, it means that all the outputs of the comparators C1-CN are high. In any other case, the output of the first stage NAND gate G0 is low. Under such arrangement, if the output of one of the comparators C1-CN is low, which means that "no current" or "very low current" condition does not occur in its corresponding path 101-10N, the corresponding one of the second stage NAND gates G1-GN outputs a high level signal to conduct the corresponding one of the paths 111-11N. If all the outputs of the comparators C1-CN are high, which means that "no current" or "very low current" conditions occur in all the paths 101-10N and therefore obviously this is at the initialization stage, the output of the first stage NAND gate G0 is low so that all the outputs of the second stage NAND gates G1-GN are high, to conduct all of the paths 111-11N. Only when one or more, but not all of the outputs of the comparators C1-CN are high, the corresponding ones of the second stage NAND gates G1-GN output low level signals to cut off the corresponding ones of the paths 111-11N.

When any one of the paths 111-11N is cut off, the gate voltage of its corresponding PMOS transistor Q1-QN should be pulled high. In one embodiment, as shown in the figure, a weak current source WCS1-WCSN is provided for each of the paths 111-11N, so that when anyone of the paths 111-11N is open, the corresponding weak current source WCS1-WCSN will pull high the gate voltage of its corresponding PMOS transistor Q1-QN. When the paths 111-11N are closed, the gate voltages of the PMOS transistors Q1-QN are respectively controlled by the voltages extracted from the paths 101-10N, while the weak current sources WCS1-WCSN do not substantially affect them. Many variations to the above arrangement are possible and can be readily conceived by those skilled in this art; for example, the weak current sources can be replaced by resistors, and the gate voltages of the PMOS transistors Q1-QN can be controlled by other means when the paths 111-11N are open.

The above description implies that the switches on the paths 111-11N are NMOS transistors, but the present invention should not be limited to this. The circuit can be modified (for example, by replacing AND gates for the NAND gates) to be adapted to other switches. Further, when all the outputs of the comparators C1-CN are high, meaning that the circuit is at the initialization stage, it does not have to conduct all the paths 111-11N; it is enough to start up the circuit if only one of the paths 111-11N is closed. Correspondingly, the output of the first stage NAND gate G0 can be supplied to only one or several, but not all of the second stage NAND gates G1-GN. The rest of the second stage NAND gates G1-GN can be omitted in this case.

FIG. 13B shows another embodiment of the UCD logic circuit 26. In this embodiment, the UCD logic circuit 26 controls the paths 121-12N instead of the paths 111-11N, and it achieves the same purpose. In comparison with the embodiment of FIG. 13A, the weak current sources WCS1-WCSN are not required, so the present embodiment has a simpler circuit structure. The logic circuit 27 in this embodiment functions in a similar way to the previous embodiment, so its details are not repeated here. Referring to FIG. 13B in conjunction with FIG. 12, note that if the circuit of FIG. 13B is used, it requires additional wiring besides the paths 111-11N between the UCD logic circuit 26 and the lowest voltage selection circuit 21 in FIG. 12. FIG. 12 does not show this wiring because it only schematically shows the concept of the present invention. However, all such variations and equivalents should belong to the scope of the present invention.

Figure 14:
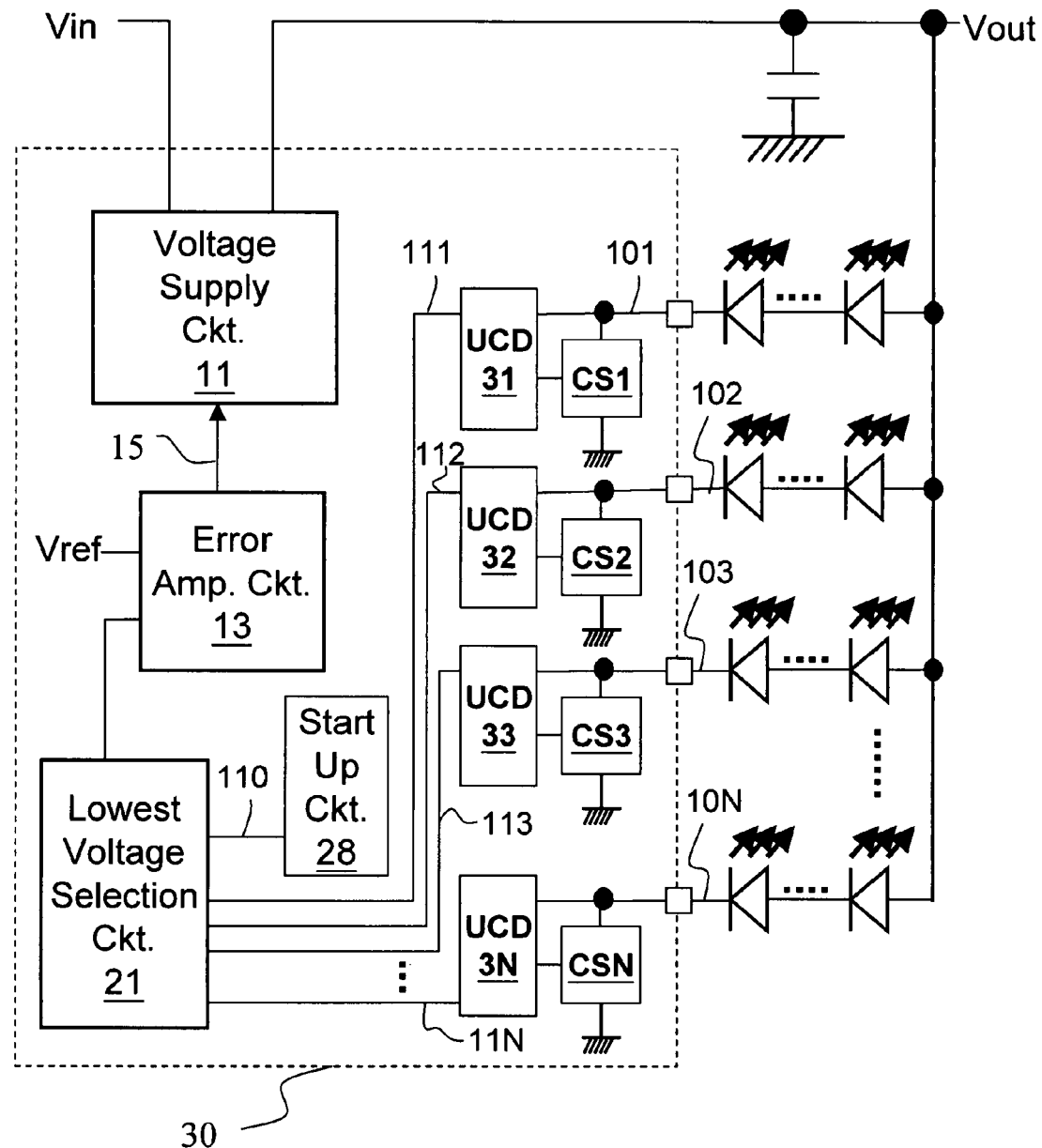
FIG. 14 is a schematic circuit diagram showing a backlight control circuit according to yet another embodiment of the present invention, wherein a start-up circuit is employed to ensure proper initialization.

Referring to FIG. 14, the malfunction issue can alternatively be solved by providing a start-up circuit. In this embodiment, the lowest voltage selection circuit 21 includes an additional input receiving the output from a start-up circuit 28. The purpose of the start-up circuit 28 is to provide the lowest voltage selection circuit 21 with a valid input 110 when all of the other paths 111-11N are cut off. The valid input is compared with the reference voltage Vref in the error amplifier circuit 13 to generate a valid signal 15, so that the voltage supply circuit 11 can begin to supply power. Thus, the start-up circuit 28 should be able to generate a voltage signal lower than the reference voltage Vref when all of the other paths 111-11N are cut off, so that the error amplifier circuit 13 can generate the signal 15, while it should also be able not to produce any substantial effect when the overall circuit has entered normal operation. There are many ways to do so; several examples will be given with reference to FIGS. 15A-15D.

Figure 15A:
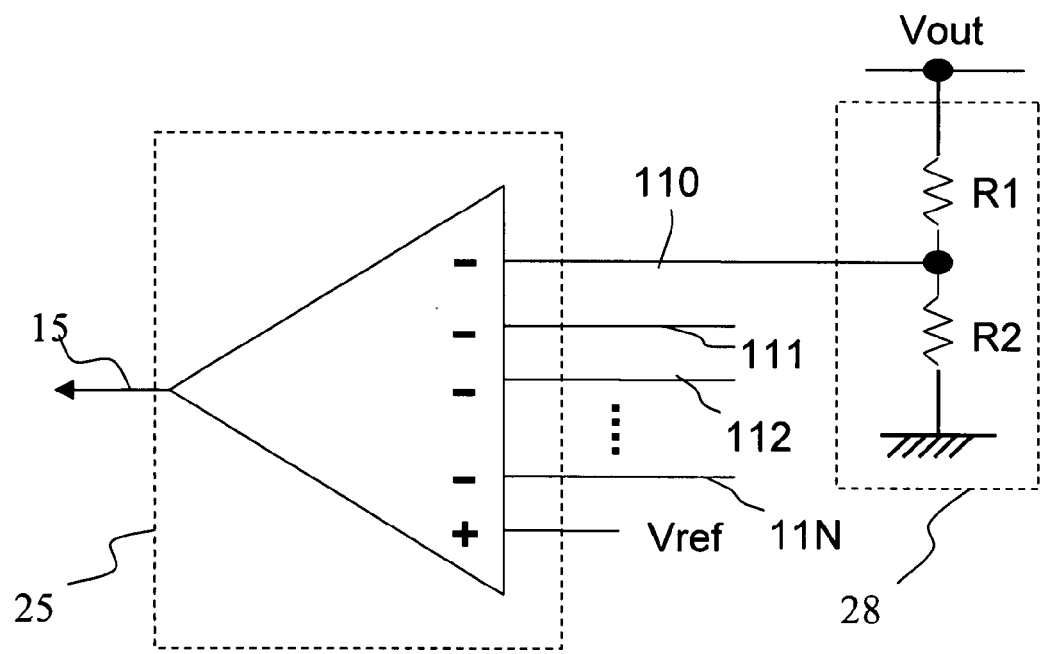
FIGS. 15A-15D show several embodiments of the start-up circuit.

Referring to both FIG. 15A and FIG. 14, a first embodiment of the start-up circuit 28 is to obtain a dividend voltage from the output voltage Vout; the resistances of the resistors R1 and R2 can be properly designed so as to provide a suitable voltage signal on the path 110. More specifically, if (1) at the circuit initialization stage, the output voltage Vout is Vint, wherein Vint is zero or far lower than a normal value; (2) when a first one of the paths 101-10N leaves the "no current" or "very low current" status, the output voltage Vout is Vmin; (3) when all of the paths 101-10N are in normal operation (all the LEDs normally operative to emit light), the minimum required output voltage Vout is Vmax; and (4) the upper limit of the output voltage Vout is Vuplimit, when an over voltage protection circuit is provided (optional), whereas Vint<Vmin<Vmax<Vuplimit, then (1) at the circuit initialization stage, all of the paths 101-10N are in "no current" or "very low current" condition; the output voltage Vint is very low, and therefore the voltage signal on the path 110 is naturally lower than the reference voltage Vref; (2) because of the function of the lowest voltage comparison and amplifier circuit 25, the voltage signal on the path 110 will increase to become equal to the reference voltage Vref; at this stage at least one of the paths 101-10N should have already left the "no current" or "very low current" status, and therefore the output voltage Vout (=Vref×[(R1+R2)/R2]) needs to be larger than or equal to Vmin; (3) after the output voltage Vout reaches Vmin, the paths 101-10N which have left the "no current" or "very low current" status may not have reached the normal operation status, so the voltages on their corresponding paths 111-11N are still lower than the reference voltage Vref; this forces the lowest voltage comparison and amplifier circuit 25 to keep generating the signal 15, driving the voltage supply circuit 11 to increase the output voltage Vout; (4) when the paths 101-10N which have left the "no current" or "very low current" status reach the normal operation status, other ones of the paths 101-10N will leave the "no current" or "very low current" status, and so on, until all of the normal paths 101-10N (i.e., those which are not open, floating or grounded) leave the "no current" or "very low current" status. Some of the paths may not have reached the normal operation status yet, but by means of the lowest voltage comparison and amplifier circuit 25 which compares its lowest input with the reference voltage Vref, every normally operative path 101-10N will finally reach the normal operation status.

It can be seen from the foregoing description that the resistances of the resistors R1 and R2 should be set so that $$\{Vref \times [(R1+R2)/R2]\} \geq Vmin$$

Moreover, the value $\{Vref \times [(R1+R2)/R2]\}$ should not be set too high. The physical meaning of the value $\{Vref \times [(R1+R2)/R2]\}$ is that, the smaller $\{Vref \times [(R1+R2)/R2]\}$ is, the faster the voltage signal on the path 110 reaches the reference voltage Vref; the larger $\{Vref \times [(R1+R2)/R2]\}$ is, the later the voltage signal on the path 110 reaches the reference voltage Vref. If $\{Vref \times [(R1+R2)/R2]\}$ is set larger than Vmax, the voltage signal on the path 110 will not reach the reference voltage Vref even when all the paths 101-10N have reached the normal operation status, that is, when all the voltage signals on the paths 111-11N are larger than or equal to the reference voltage Vref. This will force the lowest voltage comparison and amplifier circuit 25 to keep generating the signal 15, driving the voltage supply circuit 11 to increase the output voltage Vout, and waste the output power. Hence, a more preferable setting is $$Vmin < Vref \times [(R1+R2)/R2] < Vmax$$

Apparently, in the above embodiment, the dividend voltage can be obtained by devices other than the resistors R1 and R2, such as a Zener diode, or by other methods as readily conceivable by those skilled in this art.

Figure 15B:
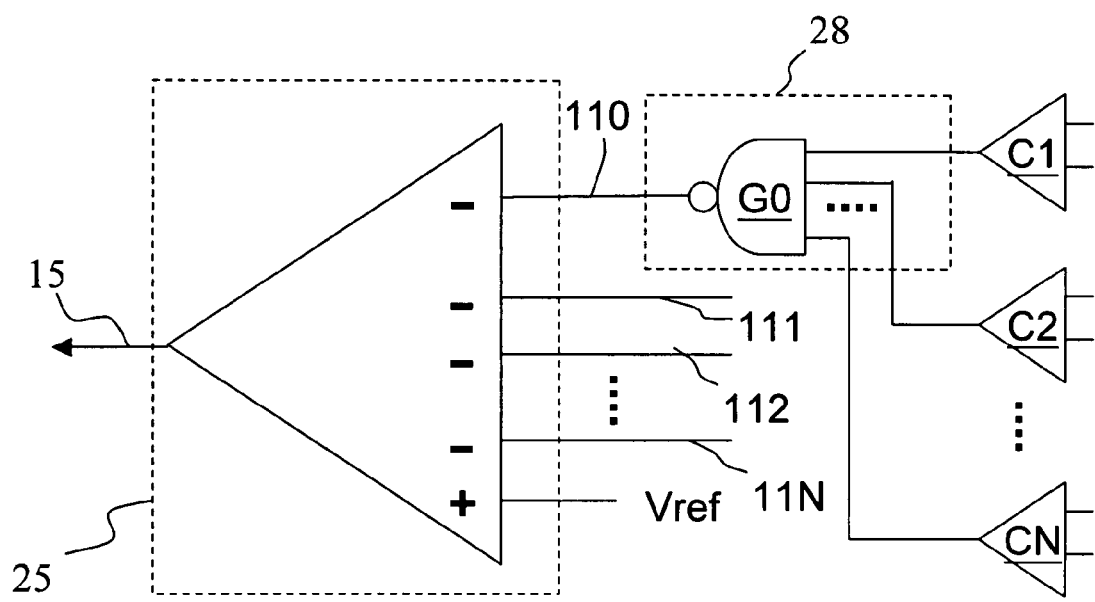

Referring to both FIG. 15B in conjunction with FIG. 14, a second embodiment of the start-up circuit 28 is to transmit the outputs of the comparators C1-CN in the UCD circuits 31-3N to a NAND gate G0, and uses the output of this NAND gate G0 as an input of the lowest voltage comparison and amplifier circuit 25. When all of the paths 101-10N are in "no current" or "very low current" condition, the outputs of the comparators C1-CN are all high, so the output of the NAND gate G0 is low; the low level output signal of the NAND gate G0 is at a level lower than the reference voltage Vref, so the lowest voltage comparison and amplifier circuit 25 outputs the signal 15, driving the voltage supply circuit 11 to increase the output voltage Vout. When anyone of the paths 101-10N leaves the "no current" or "very low current" status, the output of the NAND gate G0 becomes high; this high level output signal is higher than the reference voltage Vref (or provides an equivalent effect, as explained below), so that the lowest voltage comparison and amplifier circuit 25 is not controlled by the output of the NAND gate G0.

Figure 15C:
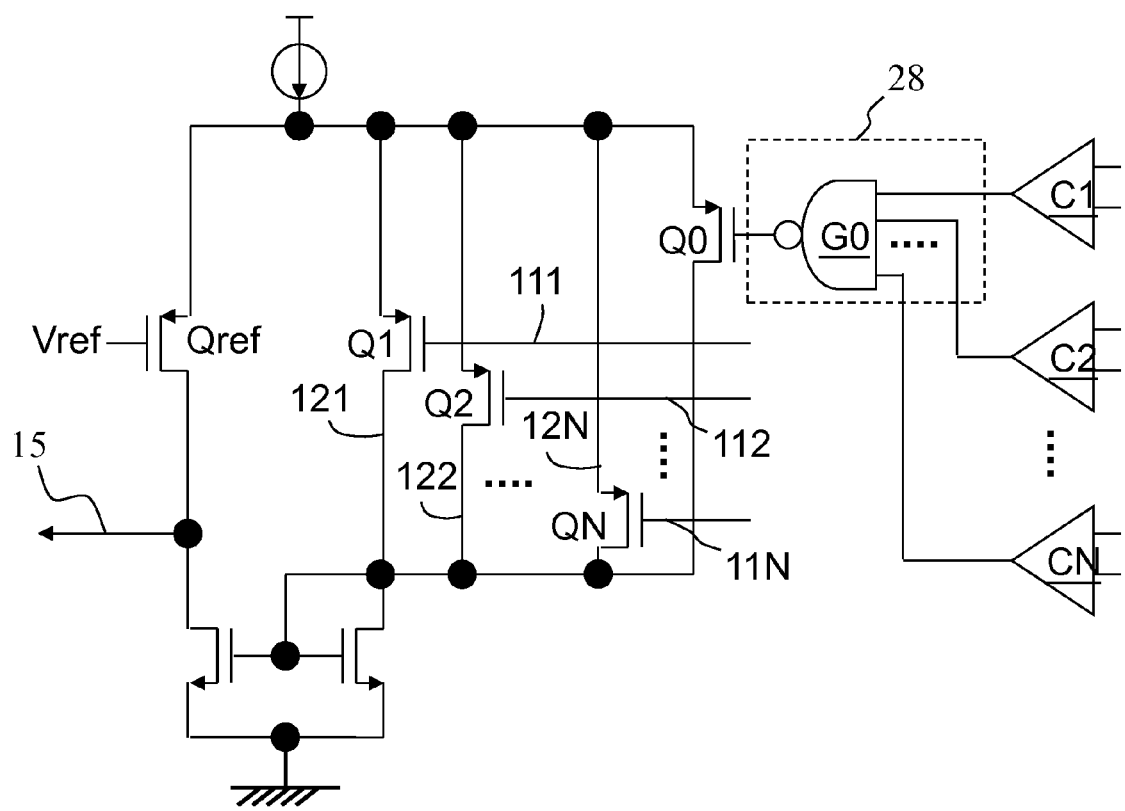
Figure 15D:
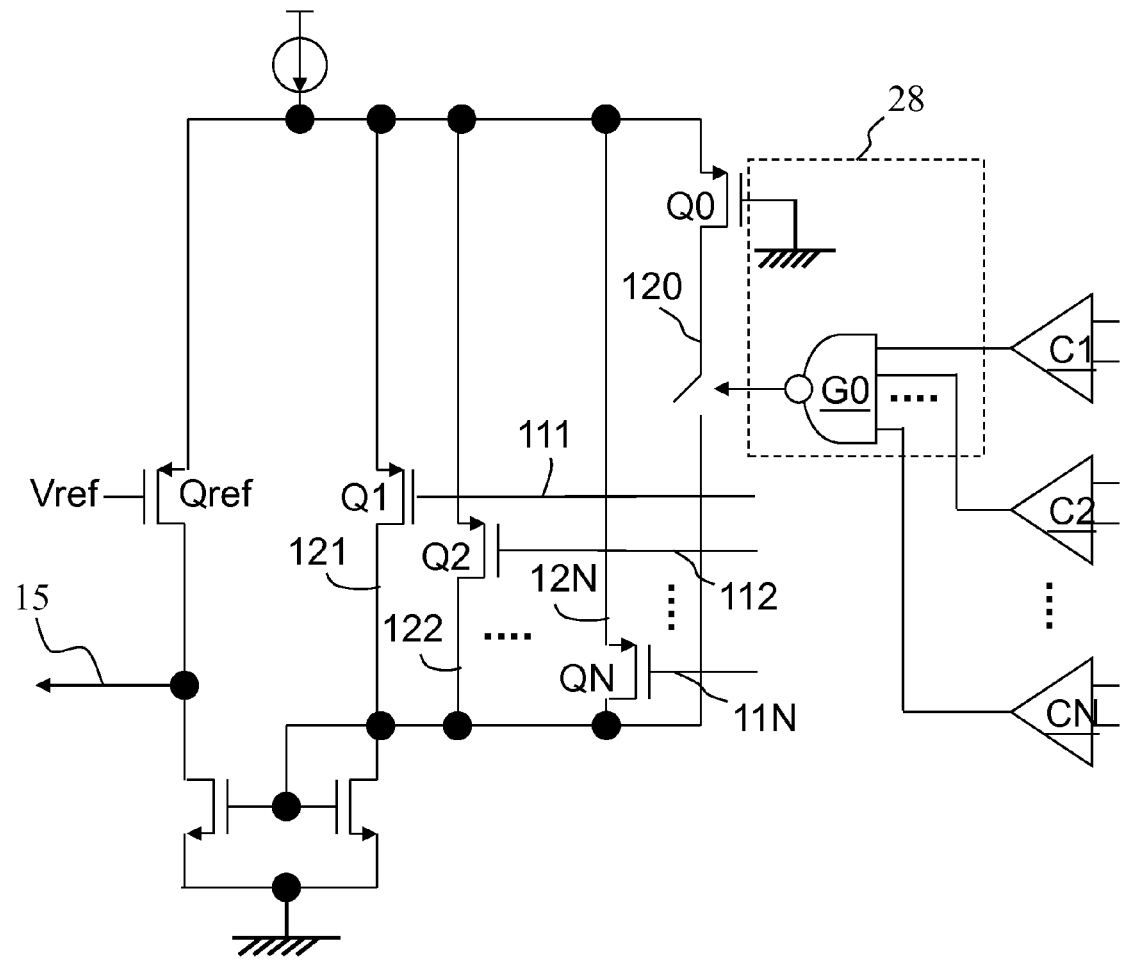

FIG. 15C provides more details to the foregoing embodiment, in which the lowest voltage comparison and amplifier circuit 25 shown in FIG. 10B is used. In fact, the transistor Q0 does not have to precisely match with the transistors Q1-QN, or Qref, because it is not required to compare the gate voltage of the transistor Q0 with the gate voltages of the other transistors in a precise manner. It is sufficient if the gate voltage of the transistor Q0, when at low level, causes the circuit to generate a proper signal 15 that drives the output voltage Vout to increase, and if the gate voltage of the transistor Q0, when at high level, causes the current passing through the transistor Q0 to be smaller than the current passing through the transistor Qref, or causes the transistor Q0 to turn OFF. Thus, the circuit can be easily realized without too much difficulty, although it uses a digital output of the NAND gate G0 for analog comparison. As another example, referring to FIG. 15D, the gate of the transistor Q0 can be connected to ground, and the digital output of the NAND gate G0 can be used to control a switch on the path 120. This ensures that the lowest voltage comparison and amplifier circuit 25 can be properly controlled by the digital output of the NAND gate G0.

As examples of more variations, at the previously mentioned "low level", the gate of the transistor Q0 does not have to be grounded, but instead can be connected to any voltage level lower than the reference voltage Vref; or, the current passing through the transistor Q0 can be made higher than the current passing through the transistor Qref (equivalent to providing an input 110 which is lower than Vref) by any means. Or, when the logic circuit 27 determines that the system is at the initialization stage, the path where the transistor Qref is located is cut off or the current passing through the transistor Qref is lowered and the voltage level of the signal 15 from the lowest voltage comparison and amplifier circuit 25 is directly set (for example, by pulling down the voltage level of the signal 15 in the circuit of FIG. 10B or pulling up the voltage level of the signal 15 in the circuit of FIG. 10C). Or even, the voltage supply circuit 11 can be directly set to increase the output voltage Vout. As such, those skilled in this art should be able to think of various modifications to the logic circuit 27 and the start-up circuit 28.

A still other variation is to temporarily force the voltage supply circuit 11 to increase the output voltage Vout to a voltage level higher than Vmin, such as Vuplimit or any predetermined voltage level, when the backlight control circuit 30 is at the initialization stage, which can be determined by the logic circuit 27 (when all the paths are in the "no current" or "very low current" condition), or by system signals such as the power on reset signal or the soft start signal. Afterwards, the voltage supply circuit 11 is controlled by normal feedback control mechanism so that its output is adjusted to the optimum voltage. The detailed circuit structure of this variation is omitted because there are multiple ways to realize it as may be readily conceived by those skilled in this art under the teachings of this invention.

As a further variation, none of the logic circuit 27 and the start-up circuit, and none of the signals relating to circuit initialization is required; when anyone or more UCD circuits 31-3N detect "no current" or "very low current" condition, the voltage supply circuit 11 first temporarily increase the output voltage Vout to a voltage level higher than Vmin, such as Vuplimit or any predetermined voltage level, and only those of the paths 101-10N which are still detected as in the "no current" or "very low current" condition by the UCD circuits 31-3N after this operation are identified as invalid, and the corresponding ones of the voltage comparison paths 111-11N are cut off. After this checking operation, the voltage supply circuit 11 goes back to its normal operation and is subject to the normal feedback control. This is a less preferred method, but still in the scope of the present invention.

As seen from the foregoing, there are many variations to prevent the UCD circuits 31-3N from malfunctioning during the circuit initialization stage. For simplicity, the specification of this invention does not include every possible way to achieve the same effect. Those skilled in this art can think of modifications and equivalents under the teachings of the present invention, which should all belong to the scope of the present invention.

Furthermore, in the foregoing description, it is assumed that the UCD circuits 31-3N will not concurrently generate low current detection signals in normal operation, except at the circuit initialization stage. However, it is still possible, although very unlikely, that all the UCD circuits 31-3N concurrently generate low current detection signals and it correctly shows that all of the paths 101-10N are inoperative. This is very possibly due to the malfunction of the output voltage Vout, for example because the output terminal is short to ground, or the loading on the paths 101-10N is too much higher than what the output voltage Vout can afford. Under such circumstance, the current from the voltage supply circuit 11 toward the output terminal will drastically increase, so a checking of such "over-current" condition can be made to determine whether the output terminal is grounded or overloaded. When such "over-current" condition occurs, one or more of the following countermeasures can be taken, such as: shutting down the voltage supply circuit 11; limiting the current supplied by the voltage supply circuit 11; shutting down the backlight control circuit; shutting down, and rebooting the backlight control circuit. The checking can be done by, e.g., extracting current from the output terminal of the voltage supply circuit 11, letting the current flow through a resistor, and comparing the voltage across the resistor with a predetermined reference voltage; or, by comparing a voltage across a power device or a switching device in the voltage supply circuit 11 which relates to the output current with a predetermined reference voltage. There are many possible variations that can be readily conceived by those skilled in this art under the teachings of the present invention.

Figure 16A:
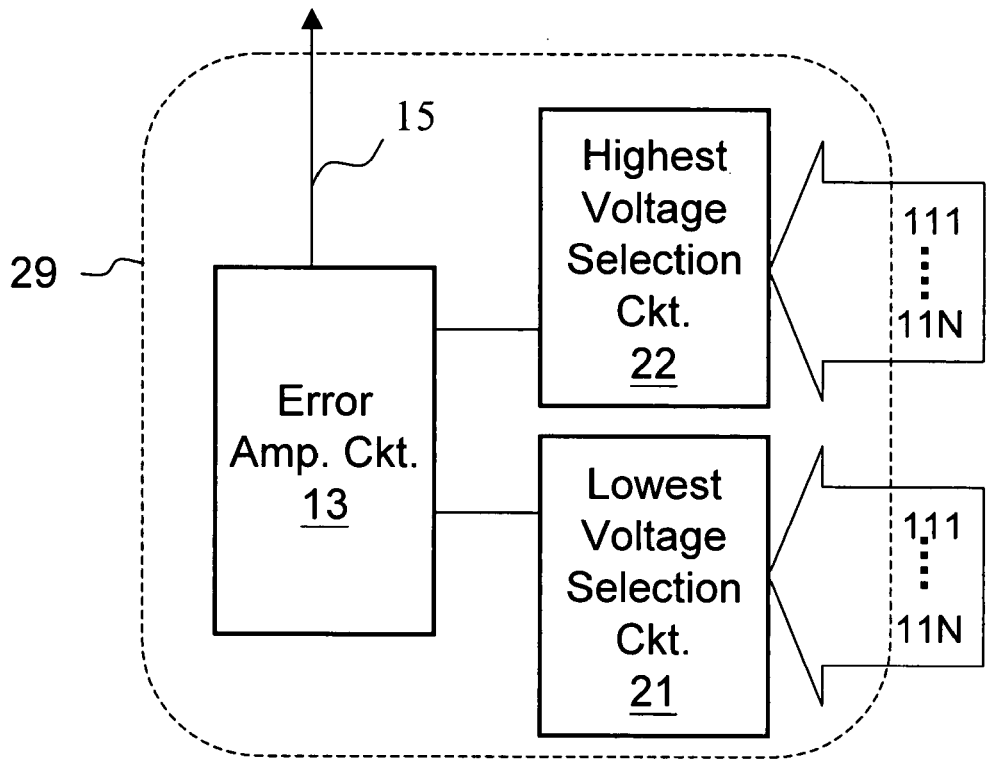
FIGS. 16A and 16B show two embodiments of the voltage selection, comparison and amplifier circuit.
Figure 16B:
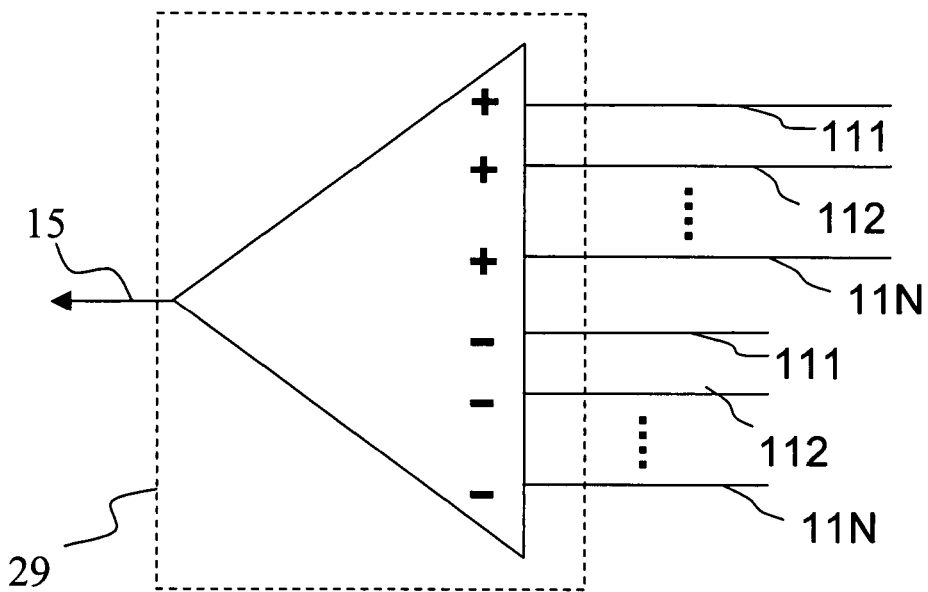

In addition to the above, the reference voltage Vref of the lowest voltage comparison and amplifier circuit 25 does not have to be a constant, but instead can be a variable; the variable reference voltage Vref is preferably a function of the voltages extracted from the paths 101-10N. For example, as shown in FIGS. 16A and 16B wherein the lowest voltage comparison and amplifier circuit 25 is replaced by a high-low voltage comparison and amplifier circuit 29. In the high-low voltage comparison and amplifier circuit 29, the other input of the error amplifier 13 is the output of the highest voltage selection circuit 22 instead of the reference voltage Vref; the control signal 15 is generated according to the comparison result between the highest voltage and the lowest voltage. For details of the high-low voltage comparison and amplifier circuit, please refer to a co-pending patent application filed by the same assignee on the same filing date, also titled "backlight control circuit".

Although the present invention has been described in considerable detail with reference to certain preferred embodiments, these embodiments are for illustrative purpose and not for limiting the scope of the present invention. Other variations and modifications are possible. For example, in all of the embodiments, one can insert a circuit which does not affect the primary function, such as a delay circuit, between any two devices which are shown to be directly connected; the voltage signal extracted from the current sources can be directly inputted to the UCD circuit as shown in FIGS. 8A-8C and 9A-9C, or indirectly inputted to the UCD circuit after certain treatment. The backlight control circuit 30 is shown to be one integrated circuit, but it can be divided into several integrated circuits, or integrated with other circuit functions. The present invention is not only applicable to series-parallel connection circuits, but also to all-in-parallel and all-in-series circuits. The light emitting device, although shown as LED in the above, are not limited thereto but can be other light emitting devices such as an organic light emitting diode. And the word "backlight" in the term "backlight control circuit" is not to be taken in a narrow sense that the circuit has to control the backlight of a screen; the present invention can be applied to "active light emission display", or "LED illuminator", or other apparatuses that employ light emitting devices. Therefore, all modifications and variations based on the spirit of the present invention should be interpreted to fall within the scope of the following claims and their equivalents.

The invention claimed is:

1. A method for controlling light emission devices, comprising:
    providing a plurality of light emission device paths connected in parallel, each path including at least one light emission device;
    supplying an output voltage to a node where the plurality of light emission device paths are coupled to;
    extracting a voltage signal from each of the plurality of light emission device paths;
    detecting whether each of the plurality of light emission device paths is in an under current status;
    during a start-up period when all of the light emission device paths start operation and are in the under current status, neglecting the detection of the under current status, and increasing the output voltage until there is at least one, but not all, of the light emission device paths which is not in the under current status, wherein the output voltage has not yet reached an upper limit; and
    after said at least one of the light emission device paths is not in the under current status, selecting the lowest one of the extracted voltages from the plurality of light emission device paths which are not in the under current status, and controlling the output voltage according to the selected lowest voltage.

2. A method for controlling light emission devices, comprising:
    providing a plurality of light emission device paths connected in parallel, each path including at least one light emission device;
    supplying an output voltage to a node where the plurality of light emission device paths are coupled to;
    extracting a voltage signal from each of the plurality of light emission device paths;
    detecting whether each of the plurality of light emission device paths is in an under current status;
    in a start-up period when the light emission devices begin to operate and all of the light emission device paths are in the under current status, supplying the output voltage and neglecting the detection of the under current status;
    leaving the start-up period and entering a normal operation period when there is at least one, but not all, of the light emission device paths which is not in the under current status and before the output voltage reaches an upper limit; and
    in the normal operation period, when at least one of the light emission device paths is not in the under current status, selecting the lowest one of the extracted voltages from the plurality of light emission device paths which are not in the under current status, and controlling the output voltage according to the selected lowest voltage.

* * * * *